(12) United States Patent
Lidian et al.

(10) Patent No.: US 9,749,096 B2
(45) Date of Patent: Aug. 29, 2017

(54) METHODS, ARRANGEMENTS AND NODES FOR PROVIDING COMPOSITE ACKNOWLEDGEMENT INFORMATION IN A WIRELESS COMMUNICATION SYSTEM

(71) Applicant: Telefonaktiebolaget L M Ericsson (publ), Stockholm (SE)

(72) Inventors: Namir Lidian, Solna (SE); Sairamesh Nammi, Kista (SE)

(73) Assignee: TELEFONAKTIEBOLAGET L M ERICSSON, Stockholm (SE)

( * ) Notice: Subject to any disclaimer, the term of this patent is extended or adjusted under 35 U.S.C. 154(b) by 332 days.

(21) Appl. No.: 14/400,010

(22) PCT Filed: Apr. 24, 2013

(86) PCT No.: PCT/SE2013/050443
§ 371 (c)(1),
(2) Date: Nov. 10, 2014

(87) PCT Pub. No.: WO2013/169176
PCT Pub. Date: Nov. 14, 2013

(65) Prior Publication Data
US 2015/0098403 A1    Apr. 9, 2015

Related U.S. Application Data

(60) Provisional application No. 61/645,714, filed on May 11, 2012.

(51) Int. Cl.
*H04W 52/04* (2009.01)
*H04L 1/18* (2006.01)

(52) U.S. Cl.
CPC .......... *H04L 1/1893* (2013.01); *H04L 1/1829* (2013.01)

(58) Field of Classification Search
CPC ... H04L 1/1893; H04L 1/1829; H04L 1/1861; H04W 52/04; H04W 52/235
See application file for complete search history.

(56) References Cited

U.S. PATENT DOCUMENTS 8,842,609 B2 * 9/2014 Lee .................. H04L 1/0015
370/280
9,112,692 B2 * 8/2015 Chen .................. H04L 1/1861
(Continued)

OTHER PUBLICATIONS

Unknown, Author, "DL throughput comparison of ACK/NAK transmission in LTE-A TDD", CATT, 3GPP TSG RAN WG1 Meeting #62, R1-104315, Madrid, Spain, Aug. 23-27, 2010, 1-4.
(Continued)

*Primary Examiner* — Ricky Ngo
*Assistant Examiner* — Lan Huong Truong
(74) *Attorney, Agent, or Firm* — Patents on Demand P.A.; Brian K. Buchheit; Scott M. Garrett

(57) ABSTRACT

There is provided a method, performed by a receiving node, for generating composite acknowledgement information for a Hybrid Automatic Repeat Request, HARQ, process. The composite acknowledgement information is generated in response to transport blocks received from a transmitting node. The method comprises the step (301) of providing, for each transport block, a positive acknowledgement/negative acknowledgement, ACK/NAK, indication for each of a plurality of transmissions of the transport block to define a respective set of ACK/NAK indications. The method also comprises the step (302) of generating the composite acknowledgement information based on the respective sets of ACK/NAK indications for the transport blocks over the plurality of transmissions. In this way, by considering respective sets of ACK/NACK indications over a plurality of transmissions, it is possible to generate an appropriate composite acknowledgment. A direct consequence of the
(Continued)

proposed technology is that the composite acknowledgement information is generated as a positive acknowledgment, ACK, if two transport blocks have been successfully received even though the two transport blocks do not belong to the same transmission.

15 Claims, 15 Drawing Sheets

(56) References Cited

U.S. PATENT DOCUMENTS

| | | | |
|---|---|---|---|
| 2008/0086669 A1* | 4/2008 | Cheng | H04L 1/004 714/748 |
| 2011/0239076 A1 | 9/2011 | Liu et al. | |
| 2011/0249656 A1* | 10/2011 | Cai | H04L 1/0028 370/336 |
| 2012/0033648 A1 | 2/2012 | Papasakellariou et al. | |
| 2012/0076078 A1* | 3/2012 | Han | H04L 1/06 370/328 |
| 2012/0207123 A1* | 8/2012 | Seo | H04L 1/1861 370/329 |

OTHER PUBLICATIONS

Unknown, Author, "UL ACK/NACK transmission on PUCCH for carrier aggregation", Panasonic, 3GPP TSG-RAN WG1 Meeting #58bis, R1-093942, Miyazaki, Japan, Oct. 12-16, 2009, 1-4.

Unknown, Author, "UL ACK/NACK transmission scheme for LTE-A", CATT, 3GPP TSG RAN WG1 meeting #57bis, R1-092789, Los Angeles, CA, USA, Jun. 29-Jul. 3, 2009, 1-3.

Wang, Yuanye et al., "System Level Analysis of ACK/NACK Bundling for Multi-Component Carrier LTE-Advanced", IEEE 2011, 1-5.

* cited by examiner

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

FIG. 5

METHODS, ARRANGEMENTS AND NODES FOR PROVIDING COMPOSITE ACKNOWLEDGEMENT INFORMATION IN A WIRELESS COMMUNICATION SYSTEM

TECHNICAL FIELD

The proposed technology relates to a method and corresponding arrangement for generating composite acknowledgement information for a Hybrid Automatic Repeat Request, HARQ, process, and a method and corresponding node in a wireless communication system for providing composite acknowledgement information for a HARQ process to a transmitting node, as well as a computer program configured to generate, when executed by a processing circuit, composite acknowledgement information.

BACKGROUND

User equipment, UE, also known as mobile stations, wireless terminals and/or mobile terminals are enabled to communicate wirelessly in a wireless communication system, sometimes also referred to as a cellular radio system. The communication may be made e.g. between two user equipment units, between a user equipment and a wire connected telephone and/or between a user equipment and a server via a Radio Access Network, RAN, and possibly one or more core networks.

The user equipment units may further be referred to as mobile telephones, cellular telephones, computer tablets or laptops with wireless capability. The user equipment units in the present context may be, for example, portable, pocket-storable, hand-held, computer-comprised, or vehicle-mounted mobile devices, enabled to communicate voice and/or data, via the radio access network, with another entity, such as another user equipment or a server.

The wireless communication system covers a geographical area which is divided into cell areas, with each cell area being served by a radio network node, or base station e.g. a Radio Base Station (RBS), which in some networks may be referred to as "eNB", "eNodeB", "NodeB" or "B node", depending on the technology and terminology used. The radio network nodes may be of different classes such as e.g. macro eNodeB, home eNodeB or pico base station, based on transmission power and thereby also cell size. A cell is the geographical area where radio coverage is provided by the radio network node/base station at a base station site. One base station, situated on the base station site, may serve one or several cells. The radio network nodes communicate over the air interface operating on radio frequencies with the user equipment units within range of the respective radio network node.

In some radio access networks, several radio network nodes may be connected, e.g. by landlines or microwave, to a Radio Network Controller, RNC, e.g. in Universal Mobile Telecommunications System, UMTS. The RNC, also sometimes termed Base Station Controller, BSC, e.g. in GSM, may supervise and coordinate various activities of the plural radio network nodes connected thereto. GSM is an abbreviation for Global System for Mobile Communications (originally: Groupe Spécial Mobile).

In 3rd Generation Partnership Project, 3GPP, Long Term Evolution, LTE, radio network nodes, or base stations, which may be referred to as eNodeBs or eNBs, may be connected to a gateway e.g. a radio access gateway, to one or more core networks.

UMTS is a third generation mobile communication system, which evolved from the GSM, and is intended to provide improved mobile communication services based on Wideband Code Division Multiple Access, WCDMA, access technology. UMTS Terrestrial Radio Access Network, UTRAN, is essentially a radio access network using wideband code division multiple access for user equipment units. The 3GPP has undertaken to evolve further the UTRAN and GSM based radio access network technologies.

The 3GPP is responsible for the standardization of GSM, UMTS, LTE and LTE-Advanced. LTE is a technology for realizing high-speed packet-based communication that may reach high data rates both in the downlink and in the uplink, and is thought of as a next generation mobile communication system relative UMTS.

In the present context, the expressions downlink, downstream link or forward link may be used for the transmission path from the radio network node to the user equipment. The expression uplink, upstream link or reverse link may be used for the transmission path in the opposite direction i.e. from the user equipment to the radio network node.

It may be desired, e.g. in LTE that flexibility for transmissions between a radio base station and a mobile terminal over a radio link is enabled. For this purpose, carrier bandwidths between 1.4 MHz and 20 MHz are supported, as is both Frequency Division Duplex, FDD, and Time Division Duplex, TDD, so that both paired and unpaired frequency spectrum can be used. For FDD, the downlink, i.e. the link from the base station to the mobile terminal, and uplink, i.e. the link from the mobile terminal to the base station, use different frequencies so called "paired frequency spectrum" and may hence transmit simultaneously. For TDD, uplink and downlink use the same frequency "unpaired" frequency spectrum" and cannot transmit simultaneously, as it would result in signal interference. Uplink and downlink may however share the time in a flexible way, and by allocating different amounts of time, such as the number of subframes of a radio frame, to uplink and downlink, it is possible to adapt to asymmetric traffic and resource needs in uplink and downlink.

The above asymmetry also leads to a significant difference between FDD and TDD. Whereas for FDD, the same number of uplink and downlink subframes is available during a radio frame, for TDD the number of uplink and downlink subframes may be different. In LTE time is structured into radio frames of 10 ms duration, and each radio frame is further divided into 10 subframes of 1 ms each. One of many consequences of this is that in FDD, a mobile terminal can always send feedback in response to a data packet in an uplink subframe subject to a certain fixed processing delay. In other words, every downlink subframe can be associated to a specific later uplink subframe for feedback generation in way that this association is one-to-one, i.e. to each uplink subframe is associated exactly one downlink subframe. For TDD however, since the number of uplink and downlink subframes during a radio frame may be different, it is in general not possible to construct such one-to-one association. For the typical case with more downlink subframes than uplink sub-frames, it is rather so that feedback from several downlink subframes requires to be transmitted in each uplink subframe. Thus the confirmation of transmitted data, i.e. an acknowledgement (ACK)/Non-acknowledgement (NAK) may be transmitted differently in FDD and TDD.

In the following, an ACK will also be denoted as a positive acknowledgement and a NAK will also be denoted as a negative acknowledgement. Sometimes, a NAK is also abbreviated as a NACK.

In order to improve performance of transmission in both the downlink and uplink direction, LTE uses Hybrid Automatic Repeat Request, HARQ. The basic idea of HARQ, for downlink transmission, is that after receiving data in a downlink subframe the terminal attempts to decode it and then reports to the base station whether the decoding was successful by sending an acknowledgement, ACK or unsuccessful by sending a negative acknowledgement, NAK. In the latter case of an unsuccessful decoding attempt, the base station thus receives a NAK in a later uplink subframe, and can retransmit the erroneously received data.

In LTE, a radio frame of 10 ms duration is divided into ten subframes, wherein each subframe is 1 ms long. In case of TDD, a subframe is either assigned to uplink or downlink, i.e. uplink and downlink transmission cannot occur at the same time, see FIG. 1A.

The first subframe of a radio frame is always allocated to downlink transmission. The second subframe is split into three special fields, Downlink Pilot Time Slot, DwPTS, Guard Period, GP, and Uplink Pilot Time Slot, UpPTS, with a total duration of 1 ms.

UpPTS is used for uplink transmission of sounding reference signals and, if so configured, reception of a shorter random access preamble. No data or control signalling may be transmitted in UpPTS.

GP is used to create a guard period between periods of downlink and uplink subframes and may be configured to have different lengths in order to avoid interference between uplink and downlink transmissions and is typically chosen based on the supported cell radius. Thus a large cell may benefit from a longer guard period as the signal propagation time becomes longer for signals sent over longer distances.

DwPTS is used for downlink transmission much like any other downlink subframe with the difference that it has shorter duration.

Different allocations of the remaining subframes to uplink and downlink transmission are supported, both allocations with 5 ms periodicity in which the first and second half-frame have identical structure, and allocations with 10 ms periodicity for which the half-frames are organized differently. For certain configurations, the entire second half-frame is assigned to downlink transmission. Currently supported configurations use 5 ms periodicity as illustrated in FIG. 1b and 10 ms periodicity as depicted in FIG. 1c. In case of 5 ms periodicity, the ratio between downlink and uplink may e.g. be 2/3, 3/2, 4/1, etc. In case of 10 ms periodicity, the ratio between downlink and uplink may e.g. be 5/5, 7/3, 8/2, 9/1 etc.

Another developing trend in wireless communication comprises Multiple-Input and Multiple-Output, MIMO, systems. MIMO is the use of multiple antennas at both the transmitter and receiver to improve communication performance. Further MIMO offers an increase in data throughput and link range without additional bandwidth or increased transmit power. It achieves this goal by spreading the same total transmit power over the antennas to achieve an array gain that improves the spectral efficiency (more bits per second per hertz of bandwidth) or to achieve a diversity gain that improves the link reliability (reduced fading). Because of these properties, MIMO has become part of modern wireless communication standards such as 3GPP LTE.

In at least some MIMO systems, the transmitting node may send multiple streams by multiple transmit antennas. The transmit streams may then go through a matrix channel comprising all paths between the transmit antennas at the transmitting node and reception antennas at the receiving node. Then, the receiving node gets the received signal vectors by the multiple reception antennas and decodes the received signal vectors into the original information.

A 4 transmitter, Tx, transmissions scheme for High-Speed Downlink Packet Access, HSDPA, is discussed within 3GPP standardization. HSDPA may also be referred to as Turbo-3G, or 3.5 G in some literature and comprise a development of the WCDMA R99 protocol. One fundamental issue with the four branch Multiple-Input and Multiple-Output, MIMO, system is how many codewords/Hybrid Automatic Repeat request (Hybrid ARQ or HARQ) processes this MIMO system should support. To reduce the signalling in uplink and downlink, it has been decided to use two HARQ processes for this system. This is because the performance of four branch MIMO with four codewords/HARQ processes is almost equal to that of two codewords/HARQ processes, while being easier to implement and define in 3GPP standard. For a two codeword-four branch MIMO, the user equipment (or the receiving node) generates up to 4 ACK/NAK information. The ACK/NAK information belonging to the same codeword/HARQ process is bundled to form a composite ACK/NAK and forwarded to the base station, or the transmitting node.

A two codeword MIMO with HARQ may comprise e.g. one ACK and one NAK belonging to the same codeword/HARQ process in the first transmission, i.e. the first transport block, TB, is ACKed while the second transport block, TB, is NACKed, as schematically illustrated in FIG. 2. The first TB belongs to a given stream and the second TB belongs to another stream, where the two streams are related to the same HARQ process. Since the composite ACK/NAK is a NAK, the base station will re-transmit the same transport blocks belonging to the same codeword. In the example above, the base station will retransmit both the first and the second transport blocks, even in the case when one of the blocks was correctly received. It may further be assumed in this exemplifying scenario that, after having retransmitted the two transport blocks, i.e. the second transmission, the first transport block, TB, is NACKed while the second transport block, TB, is ACKed. According to the composite ACK/NAK, which is a NAK, the base station again would need to re-transmit both the transport blocks. This process will be repeated, possibly in the third transmission and any further transmissions, until the receiving node, or user equipment, transmits an ACK for both the transport blocks and/or the maximum number of allowed retransmissions is reached.

Thereby is overhead signalling increased, which leads to increased signal interference, less capacity for signalling payload data, delay of signalling transmission and increased energy consumption both at the transmitting node and at the receiving node.

The above described scenario may become a problem in particular at the cell border, where the radio propagation conditions typically may be bad. Thus it may lead to that a request for handover, or a confirmation of a handover, may not be received correctly by the user equipment, which thus may advance away from the cell and lose the connection before having completed the handover procedure.

SUMMARY

It is therefore an object to provide improved generation of composite acknowledgement information for a Hybrid Automatic Repeat Request, HARQ, process.

In particular, it is an object to obviate at least some of the above mentioned disadvantages and to improve the performance in a wireless communication system.

According to a first aspect, there is provided a method, performed by a receiving node, for generating composite acknowledgement information for a Hybrid Automatic Repeat Request, HARQ, process. The composite acknowledgement information is generated in response to transport blocks received from a transmitting node. The method comprises the step of providing, for each transport block, a positive acknowledgement/negative acknowledgement, ACK/NAK, indication for each of a plurality of transmissions of the transport block to define a respective set of ACK/NAK indications. The method also comprises the step of generating the composite acknowledgement information based on the respective sets of ACK/NAK indications for the transport blocks over the plurality of transmissions.

According to a second aspect, there is provided a method, performed by a receiving node, for providing composite acknowledgement information for a Hybrid Automatic Repeat Request, HARQ, process to a transmitting node. The method comprises the step of receiving data from the transmitting node, wherein the data is received from a number of repeated transmissions of a number of transport blocks from the transmitting node. The method also comprises the step of decoding the received data, and the step of checking if the data has been correctly received. The method further comprises the step of generating the composite acknowledgement information based on the correctness check, wherein the composite acknowledgement information is generated by the method according to the first aspect. The method also comprises the step of transmitting the composite acknowledgement information to the transmitting node.

According to a third aspect, there is provided an arrangement configured to generate, in response to transport blocks received from a transmitting node, composite acknowledgement information for a Hybrid Automatic Repeat Request, HARQ, process. The arrangement comprises a processing circuit configured to provide, for each transport block, a positive acknowledgement/negative acknowledgement, ACK/NAK, indication for each of a plurality of transmissions of the transport block to define a respective set of ACK/NAK indications. The processing circuit is further configured to generate the composite acknowledgement information based on the respective sets of ACK/NAK indications for the transport blocks over the plurality of transmissions.

According to a fourth aspect, there is provided a node in a wireless communication system. The node is configured to provide composite acknowledgement information for a Hybrid Automatic Repeat Request, HARQ, process to a transmitting node. The node comprises a receiver configured to receive data from the transmitting node, wherein the data is received from a number of repeated transmissions of a number of transport blocks from the transmitting node. The node further comprises an arrangement according to the third aspect, configured to generate, in response to the transport blocks received from the transmitting node, the composite acknowledgement information. The node also comprises a transmitter configured to transmit the composite acknowledgement information to the transmitting node.

According to a fifth aspect, there is provided a computer program configured to generate, when executed by a processing circuit, composite acknowledgement information. The computer program comprises computer program code configured to provide, for each of a number of transport blocks, a positive acknowledgement/negative acknowledgement, ACK/NAK, indication for each of a plurality of transmissions of the transport block to define a respective set of ACK/NAK indications, wherein $A\_i$ is the ACK/NAK indication for transmission number i, for a first transport block, and $B\_i$ is the ACK/NAK indication for transmission number i for a second transport block, and sets A and B, respectively may be defined as:

$$A=\{A1,\ldots,Aj\},\ B=\{B1,\ldots,Bj\},$$

for transmission number i between 1 and j.

The computer program further comprises computer program code configured to generate the composite acknowledgement information based on the respective sets of ACK/NAK indications for the transport blocks over the plurality of transmissions in the following way:

$$C\_ACK\_NAK=\max(A)*\max(B),$$

wherein an individual ACK is denoted by 1 and an individual NAK by 0, and max is defined as a maximum function operating on the respective set of ACK/NAK indications.

The composite acknowledgement ACK/NAK according to embodiments herein may improve generation of the ACK/NAK message in a multi antenna environment, for example in a four branch MIMO system and in an LTE-TDD system. Advantages according to embodiments herein comprise less Radio Link Control, RLC, transmission rate. Further, transmission delay may be reduced, why embodiments herein are in particular an advantage for delay sensitive applications. Thus an improved performance within a wireless communication network is provided.

Other objects, advantages and novel features of the methods and nodes will become apparent from the following detailed description.

BRIEF DESCRIPTION OF THE DRAWINGS

The methods and nodes are described in more detail with reference to attached drawings illustrating examples of embodiments in which:

FIG. 5 is a block diagram illustrating LTE TDD transmission formats per frame of 10 ms, according to some embodiments.

DETAILED DESCRIPTION

Example embodiments described herein relate generally to a method and corresponding arrangement for generating composite acknowledgement information for a Hybrid Automatic Repeat Request, HARQ, process, and a method and corresponding node in a wireless communication system for providing composite acknowledgement information for a HARQ process to a transmitting node. In particular, it relates to the provision of composite acknowledgement feedback to the transmitting node, concerning the reception status of data packets previously received at the receiving node, from the transmitting node.

Embodiments herein may for example be defined as a node, such as e.g. a base station, and a node, such as e.g. a user equipment, and methods performed therein, which may be put into practice in the embodiments described below. These embodiments may, however, be exemplified and realised in many different forms and are not to be considered as limited to the embodiments set forth herein; rather, these embodiments are provided so that this disclosure will be thorough and complete.

Still other objects and features may become apparent from the following detailed description considered in conjunction with the accompanying drawings. It is to be understood, however, that the drawings are designed solely for purposes of illustration and not as a definition of the limits of the herein disclosed embodiments. It is further to be understood that the drawings are not necessarily drawn to scale and that, unless otherwise indicated, they are merely intended to conceptually illustrate the structures and procedures described herein.

Figure 3:
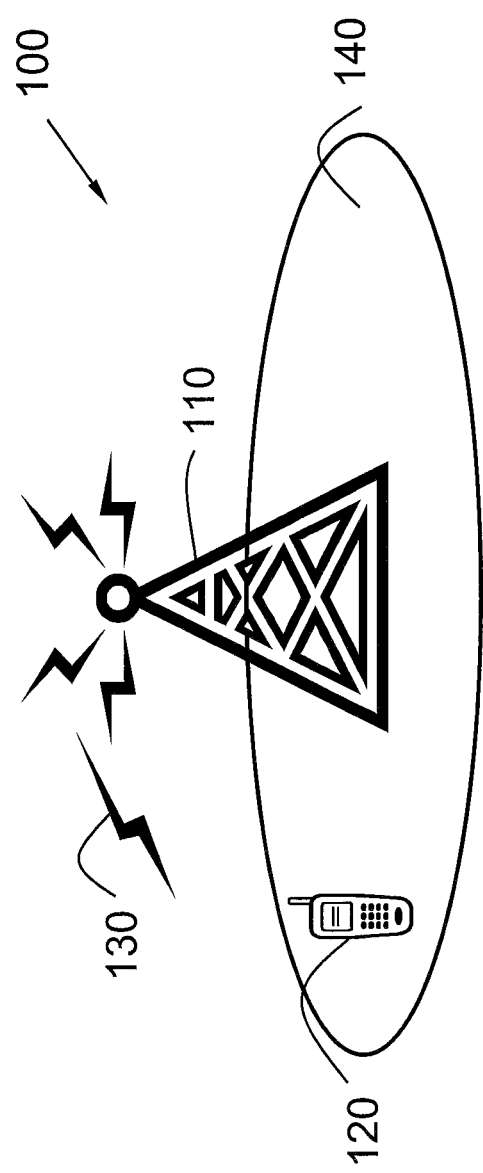
FIG. 3 is a block diagram illustrating an example of a wireless communication system.

FIG. 3 is a schematic illustration over a wireless communication system 100. The wireless communication system 100 may at least partly be based on radio access technologies such as e.g. 3GPP Long Term Evolution, LTE, LTE-Advanced, Evolved Universal Terrestrial Radio Access Network, E-UTRAN, Universal Mobile Telecommunications System, UMTS, Global System for Mobile communications, GSM, Enhanced Data rate for GSM Evolution, EDGE, Wideband Code Division Multiple Access, WCDMA, Worldwide Interoperability for Microwave Access, WiMax, or Ultra Mobile Broadband, UMB, High Speed Packet Access, HSPA, Evolved Universal Terrestrial Radio Access, E-UTRA, Universal Terrestrial Radio Access, UTRA, GSM EDGE Radio Access Network, GERAN, 3GPP2 CDMA technologies e.g. CDMA2000 1×RTT and High Rate Packet Data, HRPD, just to mention some few options.

The wireless communication system 100 may be configured to operate according to the Time Division Duplex (TDD) and/or the Frequency Division Duplex (FDD) principle, according to different embodiments, even if embodiments are described in a TDD environment.

TDD is an application of time-division multiplexing to separate uplink and downlink signals in time, possibly with a guard period situated in the time domain between the uplink and downlink signalling. FDD means that the transmitter and receiver operate at different carrier frequencies.

The purpose of the illustration in FIG. 3 is to provide a simplified, general overview for the methods, user equipment and network nodes herein described, and the functionalities involved. The methods, user equipment and network nodes will subsequently, as a non-limiting example, be described in a 3GPP/LTE environment, but the embodiments of the disclosed methods and user equipment may operate in a wireless communication system 100 based on another access technology such as e.g. any of the above enumerated. Thus, although the following embodiments are described based on 3GPP LTE systems, it is by no means limited to 3GPP LTE.

The illustrated wireless communication system 100 comprises a base station/network node/transmitting node 110 and a user equipment/receiving node 120. The transmitting node 110 and the user equipment 120 is communicating over a radio interface 130, for as long as the transmitting node 110 is the serving network node of the receiving node 120, i.e. as long as the receiving node 120 is situated within the cell 140, served by the transmitting node 110.

The transmitting node 110 serving the receiving node 120 controls the radio resource management within the serving cell 140, such as e.g. allocating radio resources to the receiving nodes 120 within the serving cell 140 and ensuring reliable wireless communication between the transmitting node 110 and the receiving node 120. The transmitting node 110 may typically comprise an eNodeB, e.g. in an LTE-related wireless communication system 100.

The receiving node 120 is configured to transmit radio signals comprising information to be received by the transmitting node 110. Contrariwise, the receiving node 120 is configured to receive radio signals comprising information transmitted by the transmitting node 110.

It is to be noted that the illustrated network setting of transmitting node 110 and receiving node 120 in FIG. 3 is to be regarded as a non-limiting embodiment only. The wireless communication network 100 may comprise any other number and/or combination of transmitting node 110 and/or receiving nodes 120, although only one instance of a transmitting node 110 and a receiving node 120, respectively, are illustrated in FIG. 3, for clarity reasons. A plurality of transmitting nodes 110 and/or receiving nodes 120 may further be involved in the present methods according to some embodiments.

Thus whenever "one" or "a/an" transmitting node 110 and/or receiving node 120 is referred to in the present context, a plurality of transmitting nodes 110 and/or user receiving nodes 120 may be involved, according to some embodiments.

The transmitting node 110 may according to some embodiments be referred to as e.g. network nodes, base stations, NodeBs, evolved Node Bs (eNBs, or eNode Bs), base transceiver stations, Access Point Base Stations, base station routers, Radio Base Stations (RBSs), macro base stations, micro base stations, pico base stations, femto base stations, Home eNodeBs, sensors, beacon devices, relay nodes repeaters or any other network nodes configured for communication with the receiving node 120 over a wireless interface, depending e.g. of the radio access technology and terminology used. It may also, within this context, be referred to as a transmitting node.

The receiving node 120 may be represented by e.g. a user equipment, a wireless communication terminal, a mobile cellular phone, a Personal Digital Assistant (PDA), a wireless platform, a mobile station, a portable communication device, a laptop, a computer, a wireless terminal acting as a relay, a relay node, a mobile relay, a Customer Premises Equipment (CPE), a Fixed Wireless Access (FWA) nodes or any other kind of device configured to communicate wirelessly with the serving network node 110. The user equipment 120 may also, within this context, be referred to as a receiving node.

However, the situation may also be the opposite in some embodiments, such that the transmitting node 110 comprises a user equipment and the receiving node 120 comprises a base station.

The transmitting node 110 and/or the receiving node 120 may use HARQ and composite ACK/NAK, at least for certain subframes, for transmitting data packets over the radio channel 130. The data packets may be transported in transport blocks within subframes over the radio channel 130. For this purpose, the transmitting node 110 may schedule a number of subframes to be transmitted to the receiving node 120. If a NAK message within the composite ACK/NAK is received from the receiving node 120, or a DTX is detected, the transmitting node 110 may retransmit the non-acknowledged subframes until they have been acknowledged by the receiving node 120 or until a time period expires, which time period may be a pre-determined time period, or until the number of retransmissions reaches a threshold limit, which may be a pre-determined limit value.

According to embodiments described herein, less overhead signalling, low delay and thereby successful handover as well as low power consumption of the receiving node 120 is provided. This is achieved according to some embodiments by enabling a composite ACK/NAK in the wireless communication system 100, which may be a multi antenna wireless communication system in some embodiments.

Some non-limiting bundling examples will subsequently be described.

Figure 4:
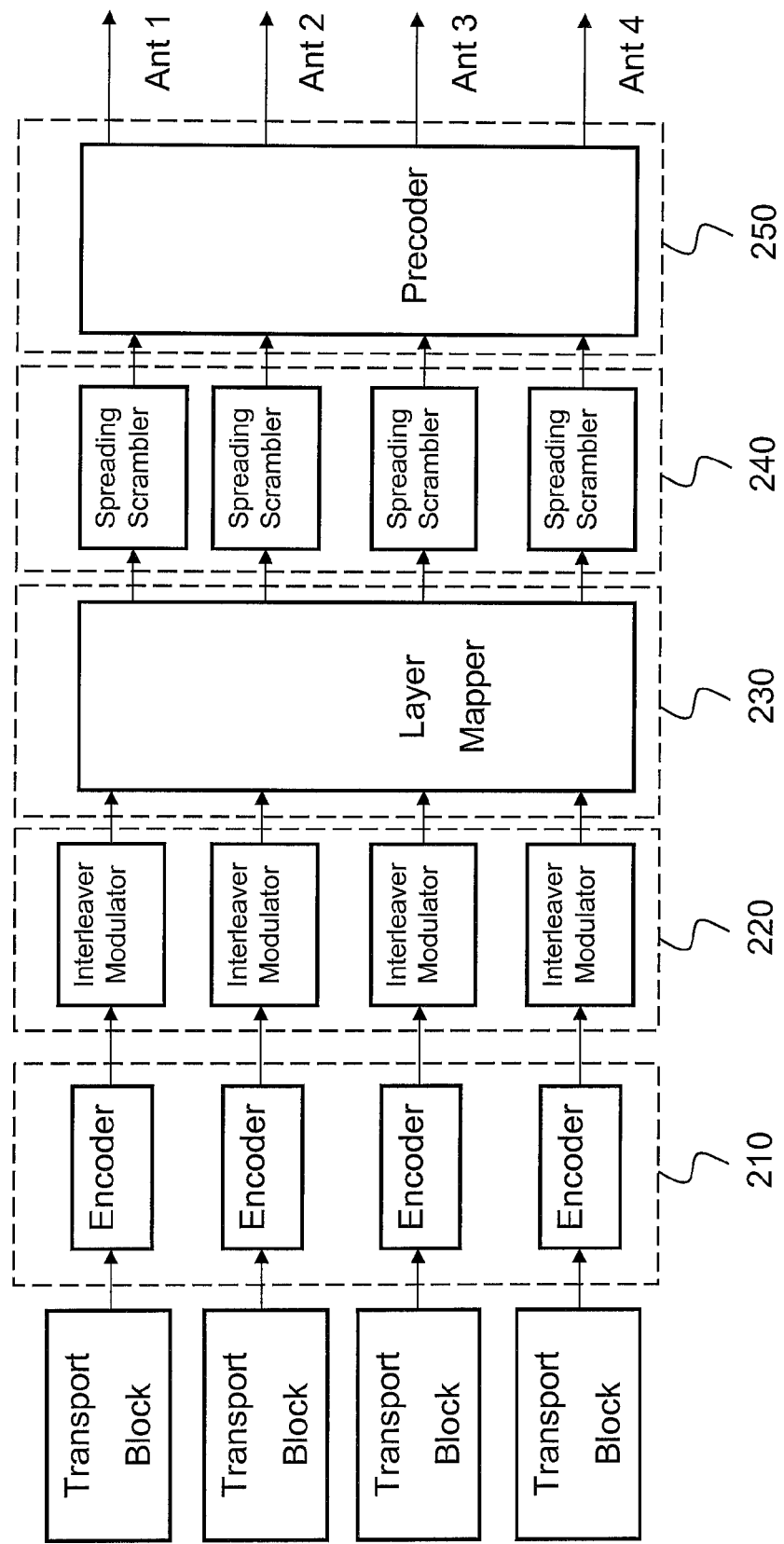
FIG. 4 is a block diagram illustrating an example of a two codeword MIMO system with four transmit antenna branches, according to some embodiments.

FIG. 4 is a block diagram illustrating an example of a two codeword-four branch MIMO system. From the feedback information (i.e. ACK/NAKs) of the receiving node 120, the adaptive controller chooses the transport block length, modulation order and the coding rate. It may also generate the precoding weight information. Note that even though we have 4 channel encoders, we receive feedback information corresponding to maximum two codewords, i.e. two HARQ processes. The mapping of HARQ process to the channel encoder/interleaver and modulator is yet to be defined. For simplicity in this non-limiting example, for rank one and two we use direct mapping and for rank three transmissions, we map the first HARQ process to the first two encoders and the second HARQ process to the third encoder. Similarly for rank four transmissions, we map the first HARQ process to the first two encoders and the second HARQ process to the third and fourth encoders. However, the mapping may be varied in some embodiments.

Another example concerns LTE TDD downlink transmission. 3GPP LTE radio interface offers high peak data rates, low delays and increase in spectral efficiencies. LTE ecosystem supports both Frequency division duplex (FDD) and Time division duplex (TDD). This enables the operators to exploit both the paired and unpaired spectrum since LTE has flexibility in bandwidth as it supports 6 bandwidths 1.4 MHz, 3 MHz, 5 MHz, 10 MHz, 15 MHz and 20 MHz. LTE-TDD is a good candidate for deployment compared to LTE-FDD with UE duty cycle limitation.

Since TDD operation involves one single carrier frequency for both uplink and downlink transmissions, both the transmitting node 110 and the receiving node 120 must switch from transmission to reception and vice versa. FIG. 5 shows the transmission format according to the 3GPP standard.

One fundamental difference between FDD and TDD is that there is no one-to-one association between uplink and downlink in TDD. The other main difference between LTE-FDD and LTE-TDD is related to the transmission of HARQ acknowledgements. For FDD, the acknowledgement of data received in a subframe "n" is transmitted in subframe "n+4", while for TDD, the acknowledgement obviously cannot be transmitted until an uplink subframe occurs. For the uplink heavy (configurations 0 and 6) and the symmetric uplink/downlink configurations (configurations 1 and 2) each downlink subframe has been associated with an uplink subframe in such a way that acknowledgements from at most one downlink subframe needs to be transmitted in every uplink subframe. However, in configurations where the number of downlink subframes per radio frame larger than the number of uplink subframes (configurations 3, 4, 5) reception of several downlink subframes may need to be acknowledged in a single uplink subframe.

According to prior art, this may be solved by ACK/NAK bundling. The bundling mechanism combines the acknowledgements from multiple HARQ processes such that a positive acknowledgement will be sent only in case all downlink transmissions were correctly received. The advantage of this method is that only one feedback bit is needed hence reduction in control channel signalling, while the drawback is that transmitting node 110 in general cannot determine which downlink subframe were erroneously decoded, and may hence resort to the simple and conservative solution to retransmit all the transmitted downlink subframes, or in other words retransmitting all the concerned transport blocks. This may lead to the degradation of downlink throughput.

However, according to some embodiments herein, any, some or all of the above described disadvantages, at least to some extent, may be solved by a method to generate the composite ACK/NAK information.

Figure 6:
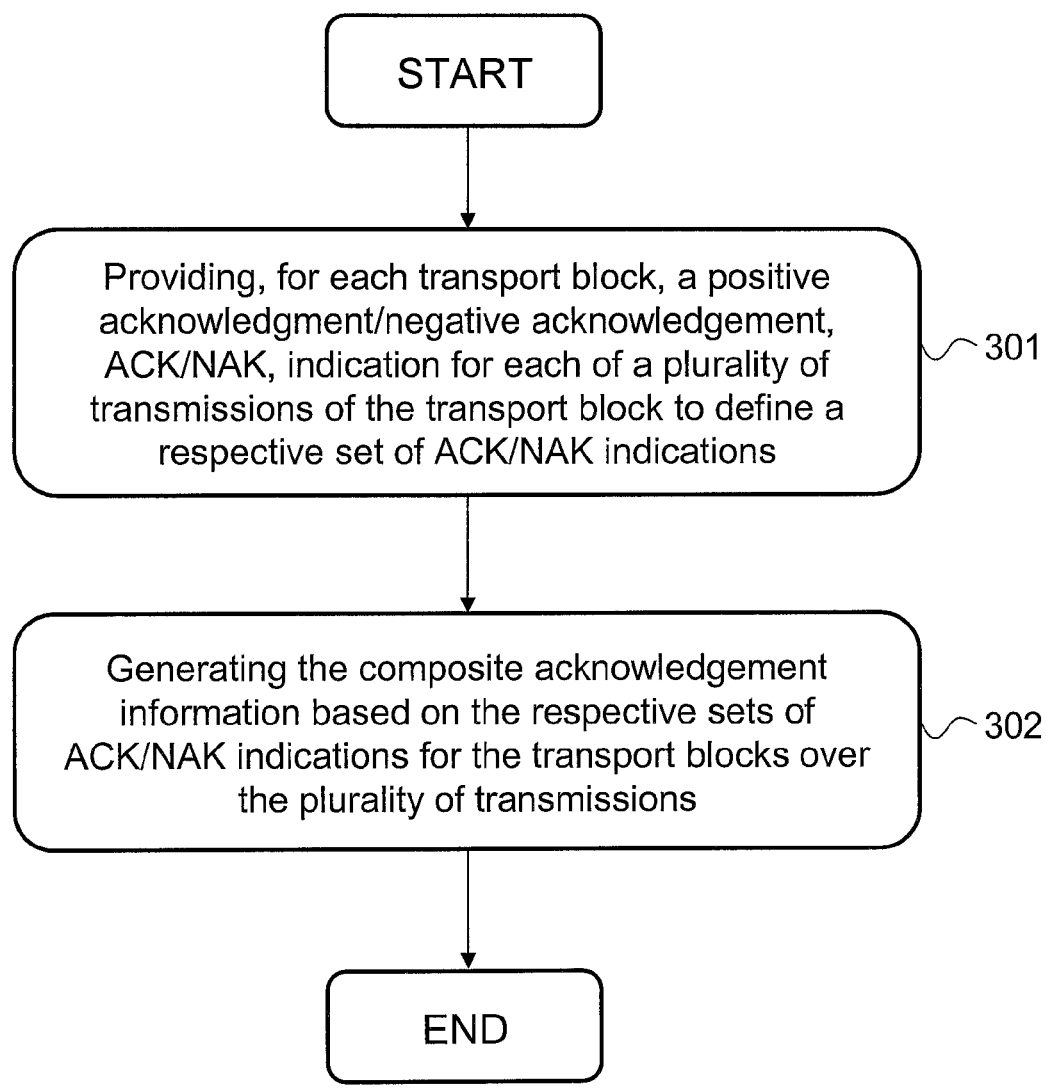
FIG. 6 is a schematic flow diagram schematically illustrating an example of a method, performed by a receiving node, for generating composite acknowledgement information for a Hybrid Automatic Repeat Request, HARQ, process, according to some embodiments.

FIG. 6 is a schematic flow diagram illustrating an example of a method, performed by a receiving node, for generating composite acknowledgement information for a Hybrid Automatic Repeat Request, HARQ, process, according to some embodiments. The composite acknowledgement information is generated in response to transport blocks received from a transmitting node. As illustrated in FIG. 6, the method comprises the step 301 of providing, for each transport block, a positive acknowledgement/negative acknowledgement, ACK/NAK, indication for each of a plurality of transmissions of the transport block to define a respective set of ACK/NAK indications. The method also comprises the step 302 of generating the composite acknowledgement information based on the respective sets of ACK/NAK indications for the transport blocks over the plurality of transmissions.

Figure 7:
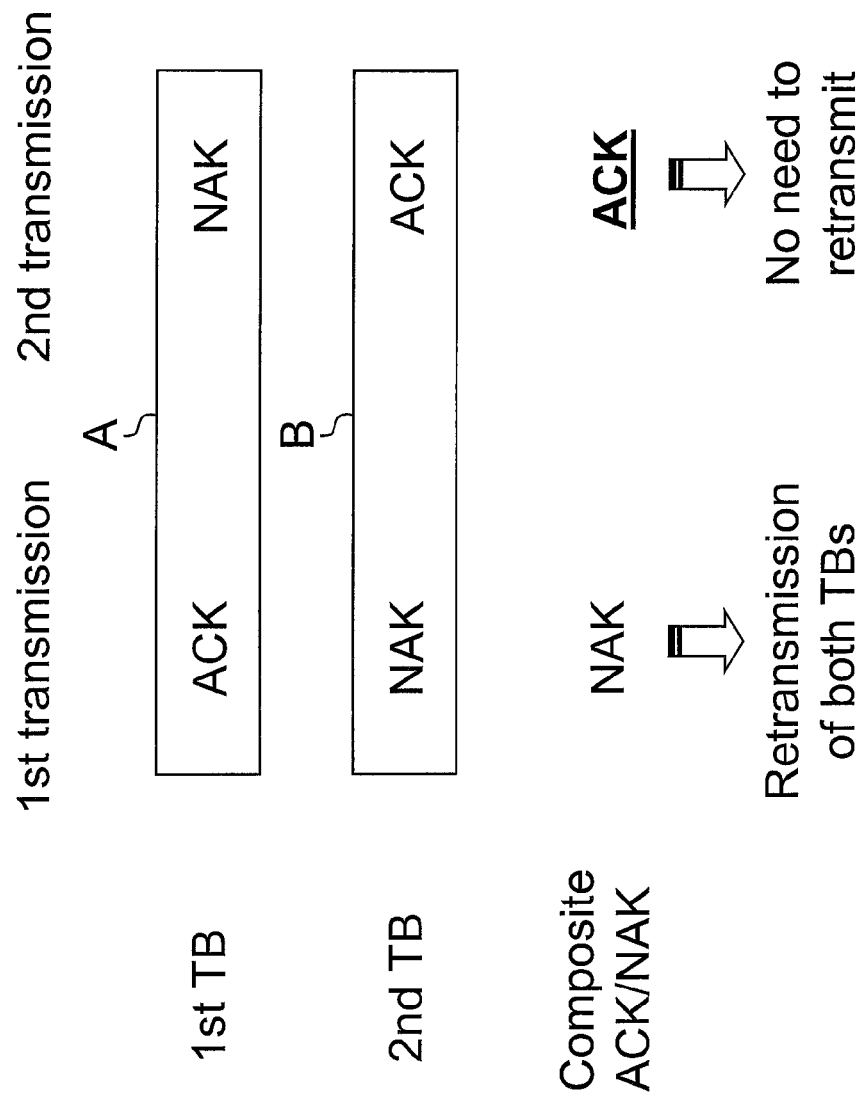
FIG. 7 is a schematic diagram schematically illustrating an example of the generation of composite acknowledgment information for a sequence of transmissions of two transport blocks according to some embodiments.

FIG. 7 is a schematic diagram schematically illustrating an example of the generation of composite acknowledgment information for a sequence of transmissions of two transport blocks according to some embodiments. For simplicity, two transport blocks related to the same HARQ process are considered. After a first transmission, the first transport block is ACKed and the second transport block is NACKed. This of course leads to a composite NAK, and a retransmission of both transport blocks. However, in the second (and any further) transmission, it is now possible to consider, for each transport block, the set of ACK/NACK indications over all considered transmissions. In this example, the first transport block is NACKed and the second transport block is ACKed after the second transmission. By providing a first set of ACK/NAK indications, denoted A, for the first transport block, and a second set of ACK/NAK indications, denoted B, for the second transport block, and using these sets of ACK/NAK indications in combination as a basis for generating the composite acknowledgement, it can be seen that both transport blocks have actually been correctly received over the two transmissions. The first transport block has been correctly received in the first transmission, and the second transport block has been correctly received in the second transmission. Therefore a composite ACK should be generated. Thus there is no need to retransmit the two transport blocks.

In this way, by considering respective sets of ACK/NACK indications over a plurality of transmissions, it is possible to generate an appropriate composite acknowledgment.

Figure 1A:
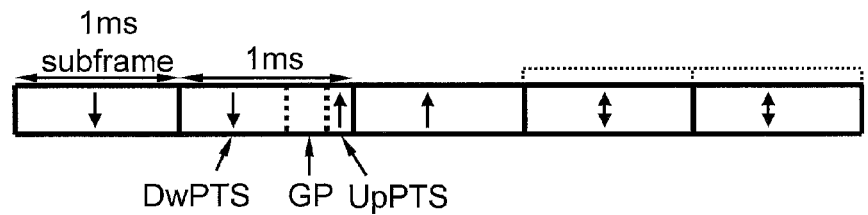
FIG. 1A is a block diagram illustrating a TDD subframe according to prior art.
Figure 1B:
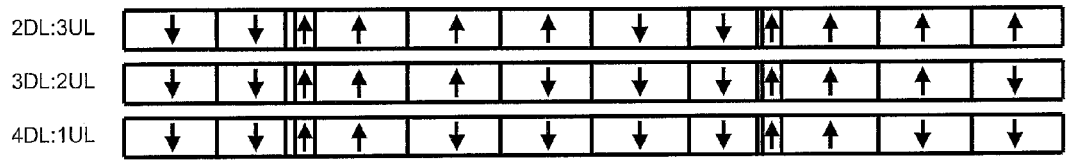
FIG. 1B is a block diagram illustrating a TDD subframe according to prior art.
Figure 1C:
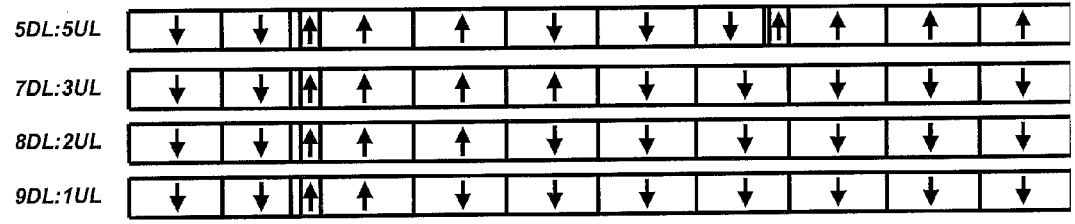
FIG. 1C is a block diagram illustrating a TDD subframe according to prior art.
Figure 2:
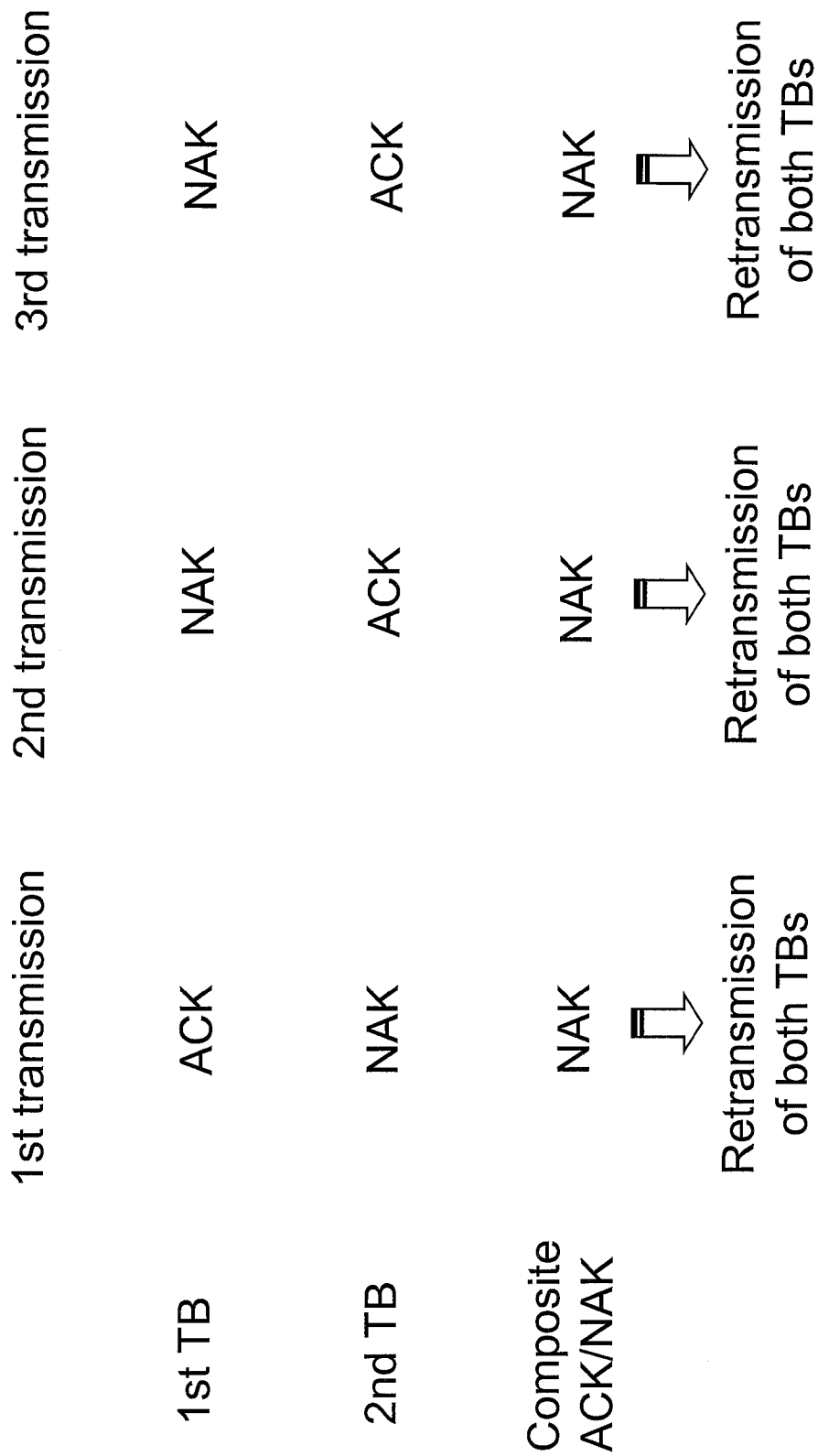
FIG. 2 is a schematic diagram illustrating an example of the generation of composite acknowledgment information for a sequence of transmissions of two transport blocks according to the prior art.

This represents a significant improvement compared to the conventional situation illustrated in FIG. 2, where a simple and conservative approach may lead to repeated retransmissions of transport blocks.

In a particular example, A_i is the ACK/NAK indication for transmission number i, for a first transport block, and B_i is the ACK/NAK indication for transmission number i for a second transport block, and sets A and B, respectively may be defined as:

$$A=\{A1, \ldots, Aj\}, B=\{B1, \ldots, Bj\},$$

for transmission number i between 1 and j.

The composite acknowledgement information is generated based on the sets A and B.

By way of example, when an individual ACK is denoted by 1 and an individual NAK by 0, the composite acknowledgement information may be defined as a composite acknowledgement in the following way:

$$C\_ACK\_NAK=\max(A)*\max(B),$$

where max is defined as a maximum function operating on the respective set A, B of ACK/NAK indications.

In other words, if both transport blocks, i.e. packet data units, that belong to the same HARQ process, i.e. have the same HARQ process identifier, have been successfully received, a positive acknowledgement, ACK, will be generated. A direct consequence of the proposed technology is that the composite acknowledgement information is generated as a positive acknowledgment, ACK, if two transport blocks have been successfully received even though the two transport blocks do not belong to the same transmission. It is thus not necessary that the two successfully decoded transport blocks that have the same HARQ process identifier belong to the same transmission or retransmission.

In a particular example, the method is performed for a HARQ process in a four-branch Multiple Input Multiple Output, MIMO, system.

In another particular example, the method is performed for a HARQ process in a Long Term Evolution, LTE, Time Division Duplex, TDD, system.

Figure 8:
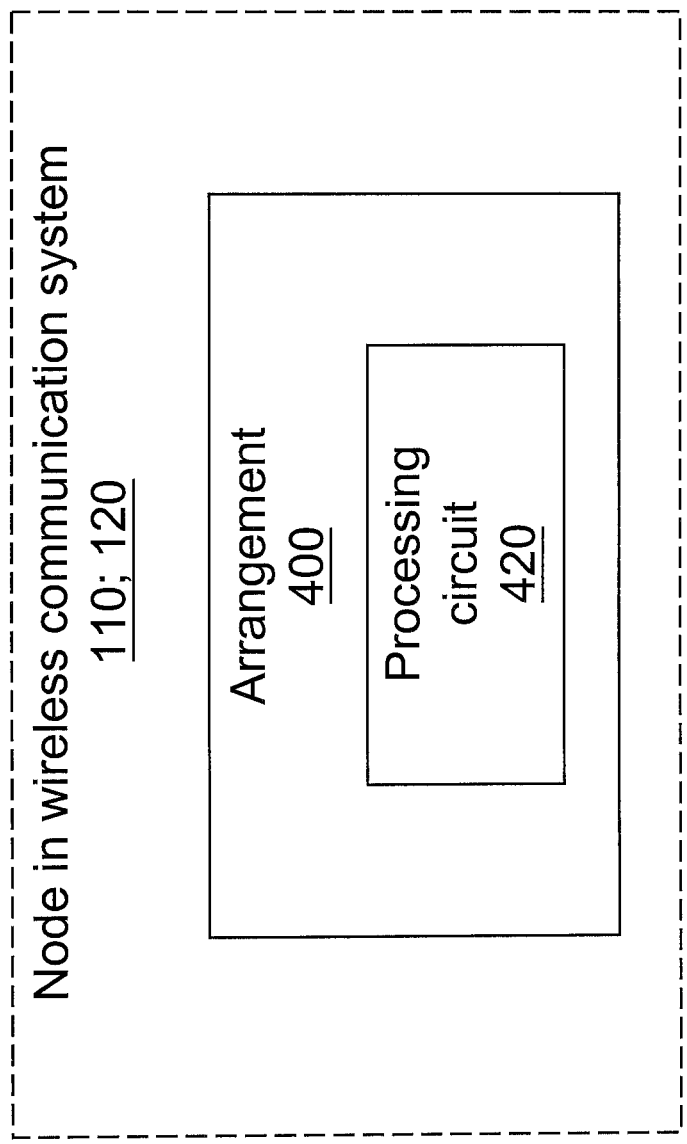
FIG. 8 is a schematic block diagram schematically illustrating an example of an arrangement configured to generate composite acknowledgement information for a Hybrid Automatic Repeat Request, HARQ, process, and a corresponding node in a wireless communication system, according to some embodiments.

FIG. 8 is a schematic block diagram schematically illustrating an example of an arrangement configured to generate composite acknowledgement information for a Hybrid Automatic Repeat Request, HARQ, process, and a corresponding node in a wireless communication system, according to some embodiments.

In this example, the arrangement 400 comprises a processing circuit 420 configured to provide, for each transport block, a positive acknowledgement/negative acknowledgement, ACK/NAK, indication for each of a plurality of transmissions of the transport block to define a respective set of ACK/NAK indications. The processing circuit 420 is further configured to generate the composite acknowledgement information based on the respective sets of ACK/NAK indications for the transport blocks over the plurality of transmissions.

By way of example, the processing circuit 420 is configured to generate the composite acknowledgement information based on sets A and B, wherein A_i is the ACK/NAK indication for transmission number i, for a first transport block, and B_i is the ACK/NAK indication for transmission number i for a second transport block, and the sets A and B, respectively may be defined as:

$$A=\{A1, \ldots, Aj\}, B=\{B1, \ldots, Bj\},$$

for transmission number i between 1 and j.

For example, the processing circuit 420 may be configured to operate based on an individual ACK being denoted by 1 and an individual NAK by 0, and to generate the composite acknowledgement information as a composite acknowledgement:

$$C\_ACK\_NAK=\max(A)*\max(B),$$

where max is defined as a maximum function operating on the respective set A, B of ACK/NAK indications.

The above mode(s) of operation means that the processing circuit 420 is configured to generate the composite acknowledgement information as a positive acknowledgment, ACK, if two transport blocks have been successfully received even though the two transport blocks do not belong to the same transmission.

In a particular example, the arrangement 400 is configured to generate composite acknowledgement information for a HARQ process in a four-branch Multiple Input Multiple Output, MIMO, system.

In another example, the arrangement 400 is configured to generate composite acknowledgement information for a HARQ process in a Long Term Evolution, LTE, Time Division Duplex, TDD, system.

The arrangement 400 for generating composite acknowledgement information may be implemented in a node 110; 120 in a wireless communication system, as schematically illustrated in FIG. 8.

Figure 9:
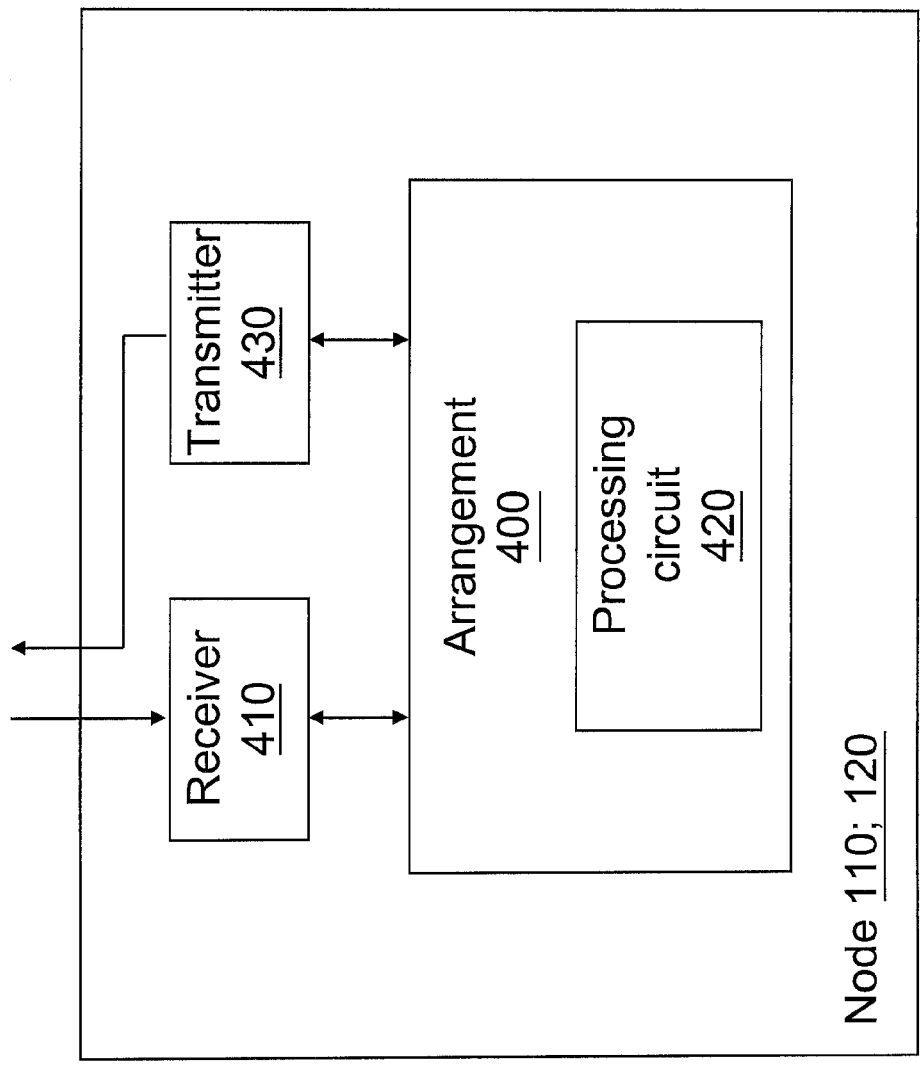
FIG. 9 is a schematic block diagram schematically illustrating a further example of a node in a wireless communication system, according to some embodiments.

FIG. 9 is a schematic block diagram schematically illustrating a further example of a node in a wireless communication system, according to some embodiments. The node 110; 120 is configured to provide composite acknowledgement information for a Hybrid Automatic Repeat Request, HARQ, process to a transmitting node. The node 110; 120 comprises a receiver 410, an arrangement 400 for composite acknowledgement, and a transmitter 430.

The receiver 410 is configured to receive data from the transmitting node. The data is received from a number of repeated transmissions of a number of transport blocks from the transmitting node.

The arrangement 400 is configured to generate, in response to the transport blocks received from the transmitting node, the composite acknowledgement information according the operation described in connection with FIG. 8.

The transmitter 430 is configured to transmit the composite acknowledgement information to the transmitting node.

The node 110; 120 may be operating as a receiving node. For example, the node 110; 120 is a User Equipment 120. Alternatively, the node 110; 120 is a base station 110.

In a particular embodiment, there is provided a receiving node configured for providing a composite acknowledgement to a transmitting node. The receiving node comprises a receiver 410 for receiving data from the transmitting node. Further, the receiving node comprises a processing circuit 420 configured for decoding the received data, checking if the data has been correctly received, and generating the composite acknowledgement based on the correctness check. Also, the receiving node may comprise a transmitter 430, configured for transmitting the composite acknowledgement to the transmitting node. Basically, the processing circuit 420 is configured to provide, for each transport block, a positive acknowledgement/negative acknowledgement, ACK/NAK, indication for each of a plurality of transmissions of the transport block to define a respective set of ACK/NAK indications. The processing circuit 420 is further configured to generate the composite acknowledgement information based on the respective sets of ACK/NAK indications for the transport blocks over the plurality of transmissions.

In a non-limiting example, bundling of two ACK/NAKS for a HARQ process corresponding to a codeword is described. A codeword identifies the HARQ process, and is sometimes referred to as a HARQ process identifier or ID. It may be assumed that an individual ACK is denoted by 1 and an individual NAK by 0. Further it may be assumed that A_i is the ACK/NAK indication for transmission number i, for the first transport block, and B_i is the ACK/NAK indication for transmission number i for the second transport block. Thus the set A and B, respectively may be defined as:

$$A=\{A1 \ldots Aj\}, B=\{B1 \ldots Bj\},$$

for transmission number i between 1 and j, where j is an integer greater than 1.

Then the composite ACK/NAK may be set to:

$$C\_ACK\_NAK=\max(A)*\max(B).$$

Figure 10:
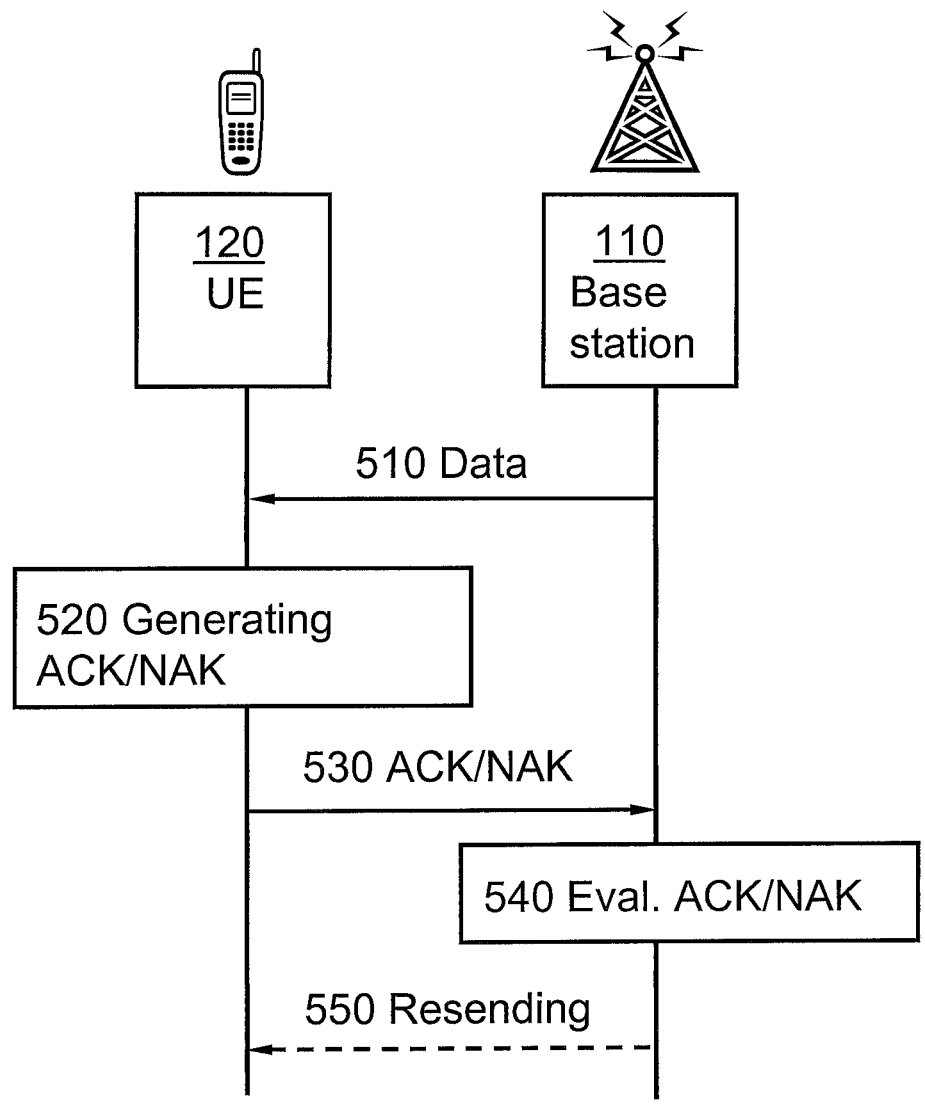
FIG. 10 is a diagram illustrating embodiments of the methods herein.

FIG. 10 is a combined signalling and flowchart illustrating radio signal transmission according to some embodiments. The purpose of this illustration is to provide a general overview of some embodiments and the functionalities involved.

Action 510

The transmitting node 110 transmits data packages in a subframe to the receiving node 120. The received subframes may according to some embodiments be comprised in a codeword in a transport block. The transmission may be made in a two codeword four branch MIMO system according to some embodiments. Further, the transmission may be made in a wireless communication system 100 based on LTE TDD.

Action 520

The receiving node 120 receives the transmitted data. According to some embodiments, the data packages are decoded within the received subframes in the receiving node 120.

A check is then performed at the receiving node 120, i.e. the user equipment, to check if the data has been correctly received. Such check may comprise e.g. running an Automatic Repeat reQuest (ARQ) scheme, also known as Automatic Repeat Query; and/or an error-detecting code such as Cyclic Redundancy Check (CRC), or similar, on the received data and comparing the result of the CRC with a received checksum, associated with the received data and computed by the transmitting node 110 before sending the data, in some embodiments. It may thereby be established if any data package within a received subframe is incorrectly received.

Thus acknowledgement information ACK/NAK may be generated at the receiving node 120. The acknowledgement information may be a positive confirmation of a correct transmission, ACK. Further, the acknowledgement information may be a negative acknowledgement, NAK, comprising an indication of that either some data package has not been received correctly, or any subframe expected to be received, has been missed.

If the receiving node 120 misses all the subframes that has been sent to it from the transmitting node 110, the result is a disruption of transmission DRX.

Each correctly received transmission in the first transport block may be denoted with an ACK, or 1, and each incorrectly received transmission in the first transport block may be denoted with an NAK, or 0 in some embodiments. This may then be repeated for all the transport blocks.

Thereafter, a composite acknowledgement is generated by combining or multiplying the results of the operation above, wherein each transmission for each block may be given an index.

Action 530

The generated composite acknowledgement information ACK/NAK is transmitted to the transmitting node 110.

Action 540

The transmitting node 110 receives the composite acknowledgement information ACK/NAK from the receiving node 120. The composite acknowledgement information may then be analysed and/or evaluated. When the acknowledgement information ACK/NAK is analysed and/or evaluated, it may be determined that the acknowledgement information only comprises positive acknowledgement ACK for all the previously transmitted data. In such case, and if there is more data to be sent to the receiving node 120, the sending may proceed by sending the subsequent subframes. Otherwise, a resending may be performed in action 550.

Action 550

Action 550 is optional and may only be performed if a negative acknowledgement NAK is received, or DRX is detected. The data for which no positive acknowledgement ACK has been received may be resent to the receiving node 120.

Figure 11:
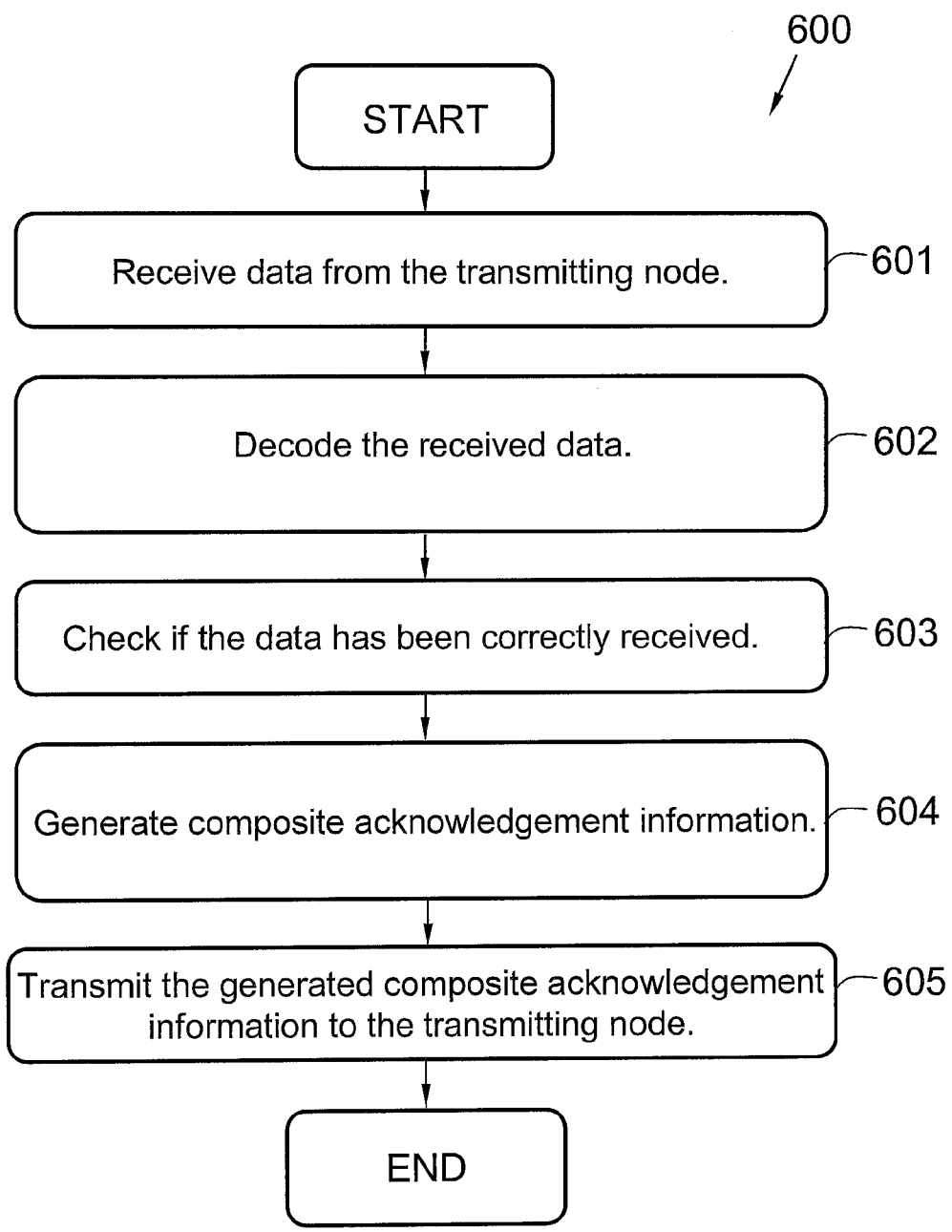
FIG. 11 is a diagram illustrating an example of a method in a receiving node, according to some embodiments.

FIG. 11 is a flow chart illustrating an embodiment of a method 600 in a receiving node 120. The method 600 aims at providing acknowledgement information to a transmitting node 110 in a wireless communication network 100.

The wireless communication network 100 may be based on third Generation Partnership Project, 3GPP, Long Term Evolution, LTE, according to some embodiments. The transmitting node 110 may be a radio network node comprising e.g. an eNB in some embodiments. Further, the transmitting node 110 may transmit data using MIMO.

Further, the method may be implemented in a time division duplex, TDD, system in an asymmetric transmission scheme wherein more data is transmitted from the receiver than from the transmitter. Thus the ratio of data/information received from a first transmission direction to information transmitted in a second, opposite, transmission direction may be X:1 (where X≠1), according to some embodiments.

In a particular embodiment, there is provided an overall method 600 in a receiving node, for providing composite acknowledgement information to a transmitting node. The method comprises receiving 601 data from the transmitting node, decoding 602 the received data, checking 603 if the data has been correctly received/decoded, generating 604 the composite acknowledgement information based on the correctness check. In particular, the composite acknowledgement information is generated by the method described above. Additionally, the method comprises transmitting 605 the composite acknowledgement information to the transmitting node.

To appropriately provide acknowledgement to the transmitting node 110, the method 600 may comprise a number of actions 601-605. It is however to be noted that the actions 601-605 may be performed in another chronological order than the enumeration indicates and that some of them, i.e. actions 602 and 603 may be performed simultaneously or in a reversed chronological order. The method 600 may comprise the following actions:

Action 601

Data is received from the transmitting node 110. The data may comprise a plurality of transmissions in transport blocks according to some embodiments.

Action 602

According to some embodiments, the data packages are decoded within the received subframes in the receiving node 120.

Action 603

A check is performed, for checking if the data has been correctly received.

Each correctly received transmission number in the first transport block may be denoted with an ACK, or 1, and each incorrectly received transmission number in the first transport block may be denoted with an NAK, or 0 in some embodiments. This may then be repeated for all the received transport blocks.

In a non-limiting example, bundling of two ACK/NAKS for a HARQ process corresponding to a codeword is described. It may be assumed that an individual ACK is denoted by 1 and an individual NAK by 0. Further it may be assumed that A_i is the ACK/NAK indication for transmission number i, for the first transport block, and B_i is the ACK/NAK indication for transmission number i for the second transport block. Thus the set A and B, respectively may be defined as (for transmission number i between 1 and j):

$$A=\{A1 \ldots Aj\}, B=\{B1 \ldots Bj\}.$$

Action 604

A composite acknowledgement is generated, preferably as described in connection with FIGS. 6 and 7.

Thus a composite acknowledgement may be generated by combining or multiplying the results of the operations above in action 603, wherein each transmission of each block may be given an index.

Then the composite acknowledgement ACK/NAK may in some embodiments be set to:

$$C\_ACK\_NAK = \max(A) * \max(B).$$

Action 605

The generated composite acknowledgement ACK/NAK is transmitted to the transmitting node 110. The transmission is performed in order to provide feedback to the transmitting node 110 concerning the reception status of the data packets within the received subframes.

Figure 12:
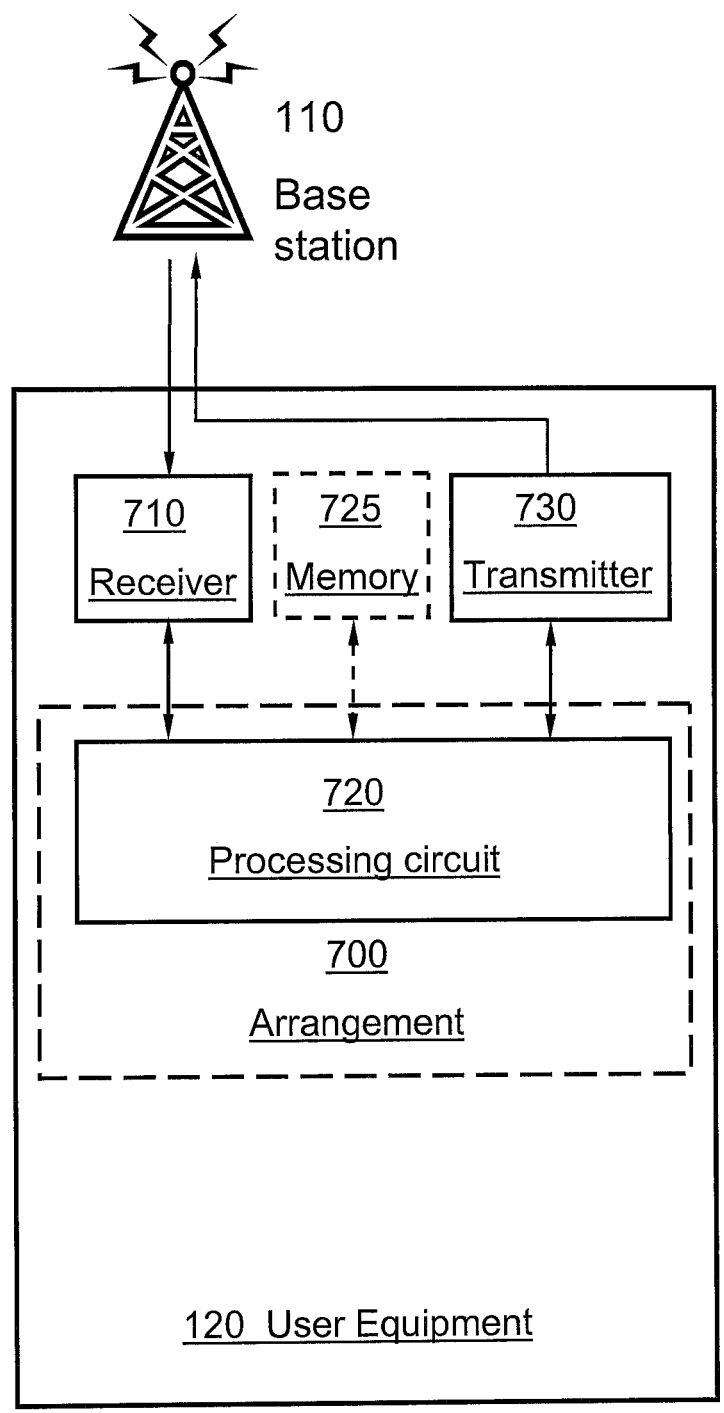
FIG. 12 is a block diagram illustrating an example of a receiving node, exemplified as a user equipment, according to some embodiments.

FIG. 12 schematically depicts an embodiment of a receiving node 120, or user equipment, configured to perform the above described actions 601-605.

The receiving node 120 may be a mobile terminal such as e.g. a mobile phone. The receiving node 120 may be configured to receive data packets from a transmitting node 110 and provide acknowledgement information or non-acknowledgement information ACK/NAK to a transmitting node 110 concerning the reception status of data packets received in a subframe from the transmitting node 110.

For the sake of clarity, any internal electronics or other components of the receiving node 120, not completely indispensable for understanding the implementation of the above described actions 601-605 comprised in the method has been omitted from FIG. 12.

In order to perform the method actions 601-605, the receiving node 120, or user equipment, comprises a plurality of units such as e.g. a receiver 710.

The receiver 710 is configured for receiving data from the transmitting node 110.

The receiving node 120 also comprises a processing circuit 720, configured for decoding the received data, analysing the received data, checking if the data has been correctly received and generating a composite acknowledgement based on the result of the analysis and/or check. The processing circuit 720 may be part of an overall arrangement 700 for generating composite acknowledgement information.

Further, the receiving node 120 also comprises a transmitter 730, configured for transmitting composite acknowledgement to the transmitting node 110.

The processing circuit 720 may comprise e.g. one or more instances of a Central Processing Unit, CPU, a processing unit, a processor, a microprocessor, means for processing data, or other processing logic that may interpret and execute instructions. The processing circuit 720 may further perform data processing functions for inputting, outputting, and processing of data comprising data buffering and device control functions, such as call processing control, user interface control, or the like.

According to some embodiments, the receiving node 120 may comprise at least one memory 725. The memory 725 may comprise a physical device utilized to store data or programs i.e. sequences of instructions, on a temporary or permanent basis. According to some embodiments, the memory 725 may comprise integrated circuits comprising silicon-based transistors. Further, the memory 725 may be volatile, non-volatile or comprise some units which are volatile and some units which are non-volatile, according to different embodiments.

Further, it is to be noted that some of the described units 710-730 comprised within the receiving node 120 in the wireless communication system 100 are to be regarded as separate logical entities but not with necessity separate physical entities. To mention just one example, the receiver 710 and the transmitter 730 may be comprised or co-arranged within the same physical unit, a transceiver, which may comprise a transmitter circuit and a receiver circuit, which transmits outgoing radio frequency signals and receives incoming radio frequency signals, respectively, via an antenna. The radio frequency signals transmitted between the receiving node 120 and the transmitting node 110 may comprise both traffic and control signals e.g. paging signals/messages for incoming calls, which may be used to establish and maintain a voice call communication with another party or to transmit and/or receive data, such as SMS, e-mail or MMS messages, with a remote user equipment, or other network nodes comprised in the wireless communication system 100.

The actions 601-605 to be performed in the receiving node 120 may be implemented through one or more processing circuits 720 in the receiving node 120, together with computer program code for performing the functions of the described actions 601-605. Thus a computer program product, comprising instructions for performing the actions 601-605 in the receiving node 120 may generate a composite acknowledgement of data received from a transmitting node 110, when being loaded into the one or more processing circuits 720.

The computer program product mentioned above may be provided for instance in the form of a data carrier carrying computer program code for performing at least some of the actions 601-605 according to some embodiments when being loaded into the processing circuit 720. The data carrier may be e.g. a hard disk, a CD ROM disc, a memory stick, an optical storage device, a magnetic storage device or any other appropriate medium such as a disk or tape that may hold machine readable data in a non-transitory manner. The computer program product may furthermore be provided as computer program code on a server and downloaded to the receiving node 120 remotely, e.g. over an Internet or an intranet connection.

Figure 13:
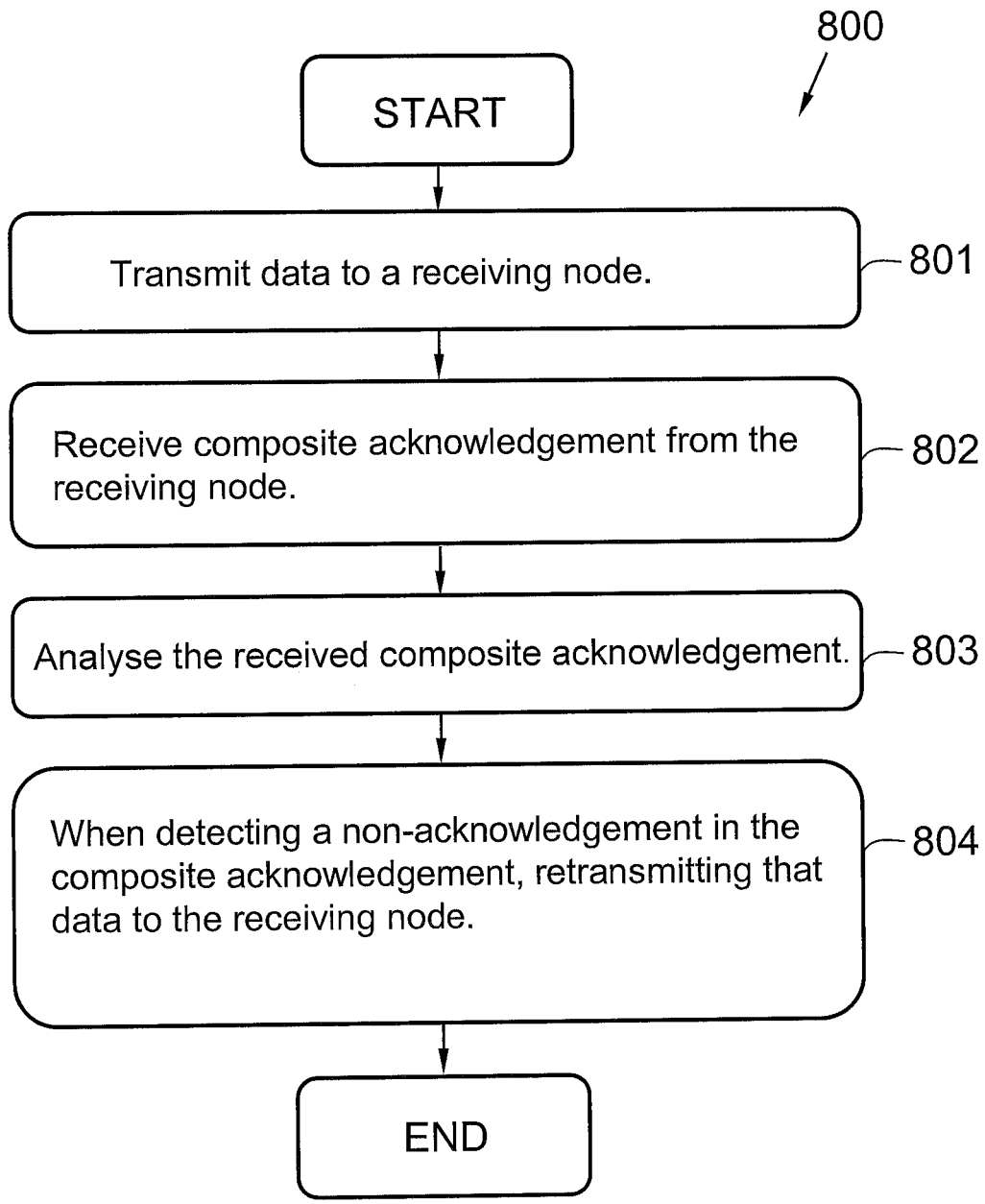
FIG. 13 is a flow chart illustrating an example of a method in a transmitting node, according to some embodiments.

FIG. 13 is a flow chart illustrating an embodiment of a method 800 in a transmitting node 110. The method 800 aims at retransmitting data to a receiving node 120, based on a received composite acknowledgement from the receiving node 120 in a wireless communication network 100.

The wireless communication network 100 may be based on third Generation Partnership Project, 3GPP, Long Term Evolution, LTE, according to some embodiments. The transmitting node 110 may be a radio network nodes comprising e.g. an eNB in some embodiments. Further, the transmitting node 110 may transmit data using MIMO.

Further, the method 800 may be implemented in a time division duplex, TDD, system in an asymmetric transmission scheme wherein more data is transmitted from the receiver than from the transmitter. Thus the ratio of data/information received from a first transmission direction to information transmitted in a second, opposite, transmission direction may be X:1 (where X≠1), according to some embodiments.

To appropriately retransmitting data to the receiving node 120, the method 800 may comprise a number of actions 801-804. It is however to be noted that the actions 801-804 may be performed in another chronological order than the enumeration indicates and that some of them, i.e. actions 802 and 803 may be performed simultaneously or in a reversed chronological order. The method 800 may comprise the following actions:

Action 801

Data is transmitted to the receiving node 120. The data may comprise a plurality of transmissions in transport blocks according to some embodiments.

Action 802

A composite acknowledgement is received from the receiving node 120. The composite acknowledgement is associated with and relates to the transmitted data.

Action 803

An analysis is performed, for analysing the composite acknowledgement and determining if the receiving node 120 has received the transmitted data correctly.

Action 804

When detecting a non-acknowledgement, NAK, corresponding data is retransmitted to the receiving node 120.

Figure 14:
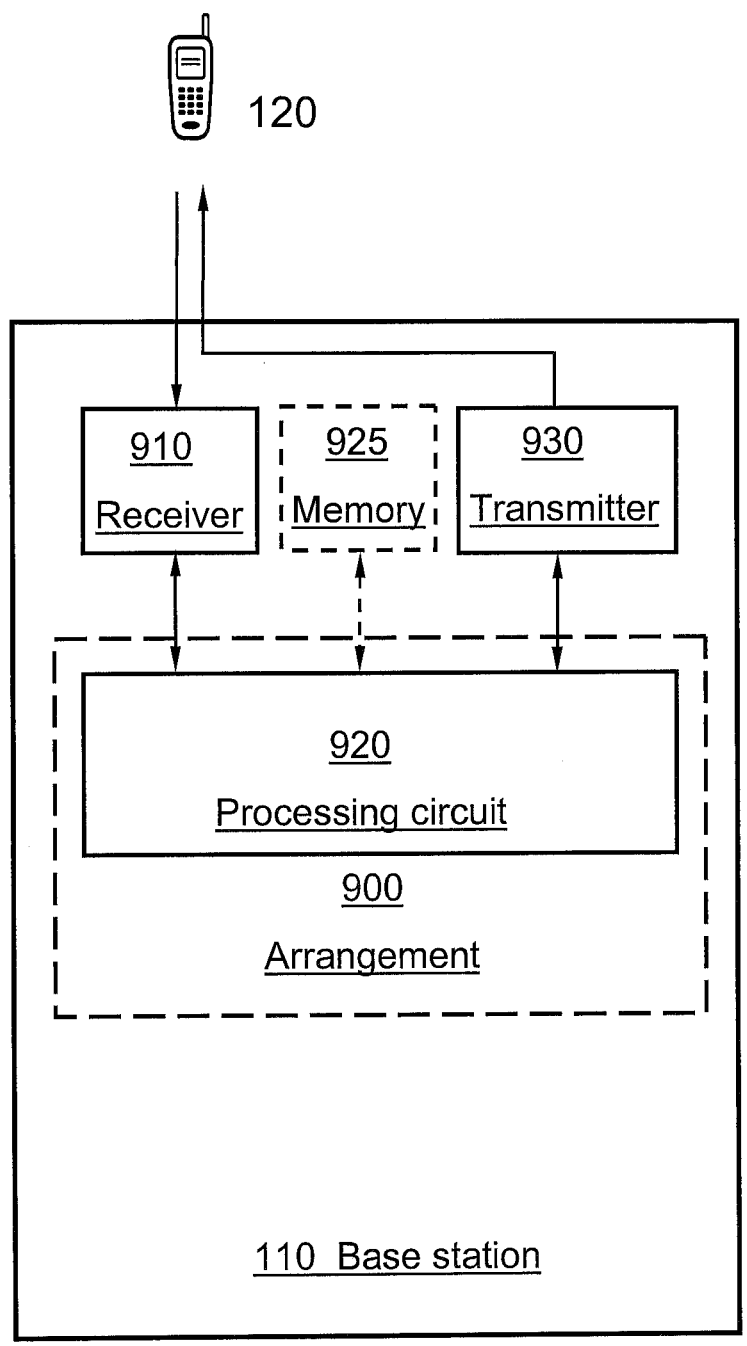
FIG. 14 is a block diagram illustrating an example of a transmitting node, or base station, according to some embodiments.

FIG. 14 schematically depicts an embodiment of a transmitting node 110, or base station, configured to perform the above described actions 801-804.

The receiving node 120 may be a mobile terminal such as e.g. a mobile phone. The transmitting node 110 may be configured for retransmitting data to a receiving node 120, based on a received composite acknowledgement from the receiving node 120 in a wireless communication network 100.

The wireless communication network 100 may be based on third Generation Partnership Project, 3GPP, Long Term Evolution, LTE, according to some embodiments. The transmitting node 110 may be a radio network nodes comprising e.g. an eNB in some embodiments. Further, the transmitting node 110 may transmit data using MIMO.

Further, the method 800 may be implemented in a time division duplex, TDD, system in an asymmetric transmission scheme wherein more data is transmitted from the receiver than from the transmitter. Thus the ratio of data/information received from a first transmission direction to information transmitted in a second, opposite, transmission direction may be X:1 (where X≠1), according to some embodiments.

For the sake of clarity, any internal electronics or other components of the transmitting node 110, not completely indispensable for understanding the implementation of the above described actions 801-804 comprised in the method has been omitted from FIG. 14.

In order to perform the method actions 801-804, the transmitting node 110 comprises a plurality of units such as e.g. a receiver 910.

The receiver 910 is configured for receiving acknowledgement such as composed acknowledgement from the receiving node 120.

The transmitting node 110 also comprises a processing circuit 920, configured for analysing the composite acknowledgement and determining if the receiving node 120 has received the transmitted data correctly. The processing circuit 920 is also configured for detecting a transmission number for which a non-acknowledgement has been comprised in the composite acknowledgement and determining to retransmit that data to the receiving node 120.

Further, the transmitting node 110 also comprises a transmitter 930, configured for transmitting/re-transmitting data to the receiving node 120.

The processing circuit 920 may comprise e.g. one or more instances of a Central Processing Unit, CPU, a processing unit, a processor, a microprocessor, means for processing data, or other processing logic that may interpret and execute instructions. The processing circuit 920 may further perform data processing functions for inputting, outputting, and processing of data comprising data buffering and device control functions, such as call processing control, user interface control, or the like.

According to some embodiments, the receiving node 120 may comprise at least one memory 925. The memory 925 may comprise a physical device utilized to store data or programs i.e. sequences of instructions, on a temporary or permanent basis. According to some embodiments, the memory 925 may comprise integrated circuits comprising silicon-based transistors. Further, the memory 925 may be volatile, non-volatile or comprise some units which are volatile and some units which are non-volatile, according to different embodiments.

Further, it is to be noted that some of the described units 910-930 comprised within the transmitting node 110 in the wireless communication system 100 are to be regarded as separate logical entities but not with necessity separate physical entities. To mention just one example, the receiver 910 and the transmitter 930 may be comprised or co-arranged within the same physical unit, a transceiver, which may comprise a transmitter circuit and a receiver circuit, which transmits outgoing radio frequency signals and receives incoming radio frequency signals, respectively, via an antenna. The radio frequency signals transmitted between the receiving node 120 and the transmitting node 110 may comprise both traffic and control signals e.g. paging signals/messages for incoming calls, which may be used to establish and maintain a voice call communication with another party or to transmit and/or receive data, such as SMS, e-mail or MMS messages, with a remote user equipment, or other network nodes comprised in the wireless communication system 100.

The actions 801-804 to be performed in the transmitting node 110 may be implemented through one or more processing circuits 920 in the transmitting node 110, together with computer program code for performing the functions of the described actions 801-804. Thus a computer program product, comprising instructions for performing the actions 801-804 in the transmitting node 110 may retransmit data to a receiving node 120, based on a received composite acknowledgement from the receiving node 120 when being loaded into the one or more processing circuits 920.

The computer program product mentioned above may be provided for instance in the form of a data carrier carrying computer program code for performing at least some of the actions 801-804 according to some embodiments when being loaded into the processing circuit 920. The data carrier may be e.g. a hard disk, a CD ROM disc, a memory stick, an optical storage device, a magnetic storage device or any other appropriate medium such as a disk or tape that may hold machine readable data in a non-transitory manner. The computer program product may furthermore be provided as computer program code on a server and downloaded to the transmitting node 110 remotely, e.g. over an Internet or an intranet connection.

When acting as a receiving node, the base station 110 of FIG. 14 may be configured to perform at least some of the actions 601-605 described in connection with FIG. 11. In particular, the processing circuit 920 may then be part of an overall arrangement 900 for generating composite acknowledgement information.

It will be appreciated that the methods and devices described above can be combined and re-arranged in a variety of ways, and that the methods can be performed by one or more suitably programmed or configured digital signal processors and other known electronic circuits, e.g. discrete logic gates interconnected to perform a specialized function, or application-specific integrated circuits.

Many aspects of the proposed technology are described in terms of sequences of actions that can be performed by, for example, elements of a programmable computer system.

The steps, functions, procedures and/or blocks described above may be implemented in hardware using any conventional technology, such as discrete circuit or integrated circuit technology, including both general-purpose electronic circuitry and application-specific circuitry.

Alternatively, at least some of the steps, functions, procedures and/or blocks described above may be implemented in software for execution by a suitable computer or processing device such as a microprocessor, Digital Signal Processor, DSP, and/or any suitable programmable logic device such as a Field Programmable Gate Array, FPGA, device and a Programmable Logic Controller, PLC, device.

It should also be understood that it may be possible to re-use the general processing capabilities of any device or unit in which the present technology is implemented, such as a base station, network controller or scheduling node. It may also be possible to re-use existing software, e.g. by reprogramming of the existing software or by adding new software components.

In the following, an example of a computer-implementation will be described with reference to FIG. 15.

Figure 15:
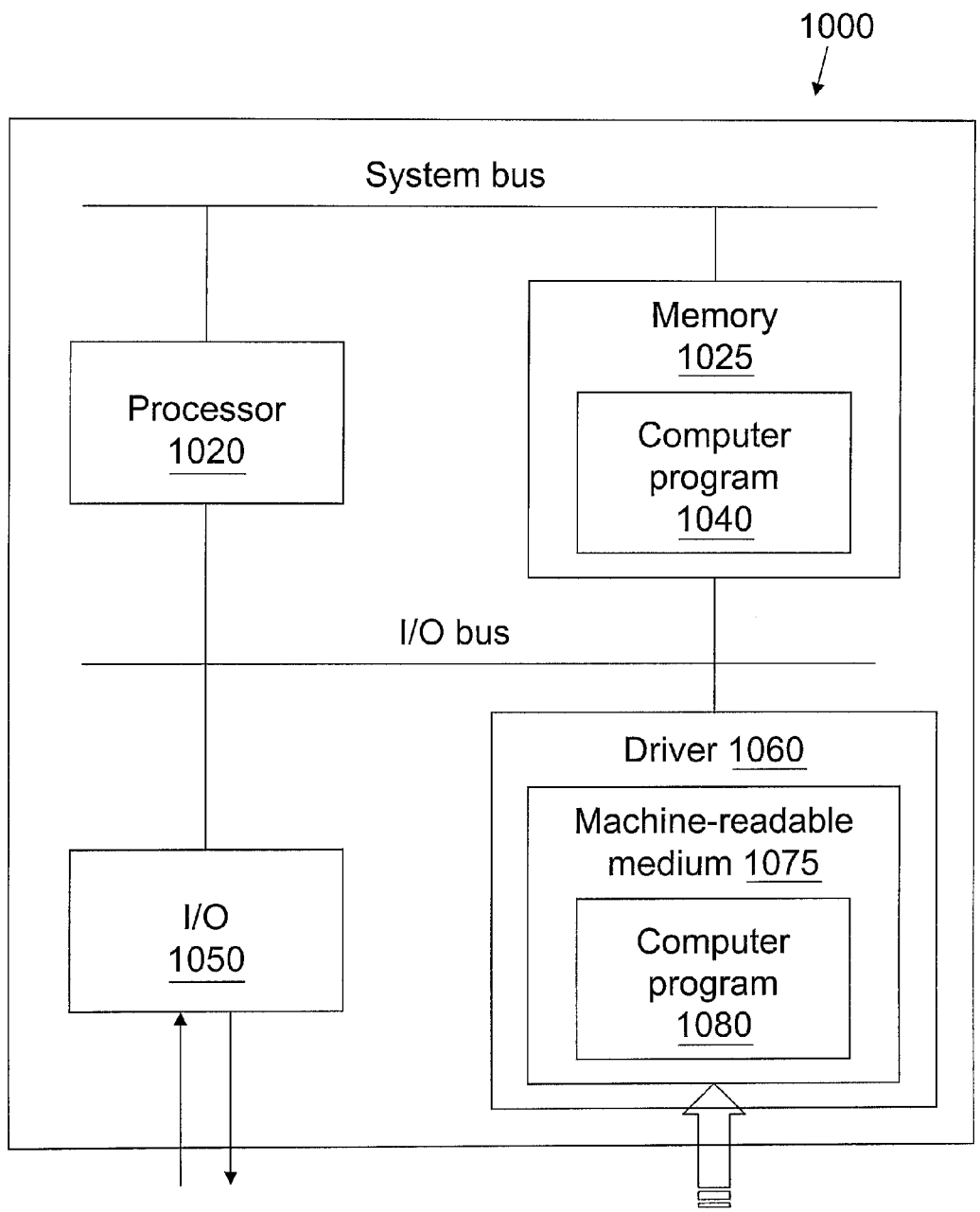
FIG. 15 is a schematic diagram illustrating an example of a computer implementation, according to some embodiments.

FIG. 15 is a schematic diagram illustrating an example of a computer implementation including a computer program for execution by a suitable processor, according to some embodiments.

The computer implementation 1000 this embodiment is based on a processor 1020 such as a micro processor or digital signal processor, a memory 1025, an input/output (I/O) controller 1050 and an optional driver 1060 for a computer-readable or machine-readable medium 1075.

In this particular example, at least some of the steps, functions and/or blocks described above are implemented in a computer program 1040, which is loaded into memory 1025 for execution by the processor 1020. The processor 1020 and the memory 1025 are interconnected to each other via a system bus to enable normal software execution. The I/O controller 1050 may be interconnected to the processor 1020 and/or memory 1025 via an I/O bus to enable input and/or output of relevant data such as input parameter(s) and/or resulting output parameter(s).

In this particular example, the memory 1025 includes a computer program 1040 for implementing the functionality of the embodiments described above including steps, functions, procedures and/or blocks.

Moreover, the present technology can additionally be considered to be embodied within any form of computer-readable medium having stored therein an appropriate set of instructions for use by or in connection with an instruction-execution system, apparatus, or device, such as a computer-based system, processor-containing system, or other system that can fetch instructions from a medium and execute the instructions. The software, here exemplified in the form of computer program 1080, may then be realized as a computer program product, which is normally carried on a non-transitory computer-readable or machine-readable medium 1075, for example a CD, DVD, USB memory, hard drive or any other conventional memory device. The computer program 1080 may thus be loaded into the memory 1025 as an instance 1040 of the computer program instance for execution by the processor 1020.

The computer/processor/controller does not have to be dedicated to execute only the above-described steps, functions, procedure and/or blocks, but may also execute other software tasks.

In particular, the computer program 1040; 1080 is configured to generate, when executed by a processing circuit such as processor 1020, composite acknowledgement information. The computer program 1040; 1080 comprises computer program code configured to provide, for each of a number of transport blocks, a positive acknowledgement/negative acknowledgement, ACK/NAK, indication for each of a plurality of transmissions of the transport block to define a respective set of ACK/NAK indications, wherein A_i is the ACK/NAK indication for transmission number i, for a first transport block, and B_i is the ACK/NAK indication for transmission number i for a second transport block, and sets A and B, respectively may be defined as:

$$A=\{A1,\ldots,Aj\}, B=\{B1,\ldots,Bj\},$$

for transmission number i between 1 and j.

The computer program 1040; 1080 further comprises computer program code configured to generate the composite acknowledgement information based on the respective sets of ACK/NAK indications for the transport blocks over the plurality of transmissions in the following way:

$$C\_ACK\_NAK=\max(A)*\max(B),$$

wherein an individual ACK is denoted by 1 and an individual NAK by 0, and max is defined as a maximum function operating on the respective set of ACK/NAK indications.

There is also provided a computer program product comprising a machine-readable medium 1025; 1075 having stored thereon a computer program 1040; 1080.

The terminology used in the detailed description of the particular exemplary embodiments illustrated in the accompanying drawings is not intended to be limiting of the described methods and receiving node 120 and transmitting node 110.

As used herein, the term "and/or" comprises any and all combinations of one or more of the associated listed items.

Further, as used herein, the common abbreviation "e.g.", which derives from the Latin phrase "exempli gratia," may be used to introduce or specify a general example or examples of a previously mentioned item, and is not intended to be limiting of such item. If used herein, the common abbreviation "i.e.", which derives from the Latin phrase "id est," may be used to specify a particular item from a more general recitation. The common abbreviation "etc.", which derives from the Latin expression "et cetera" meaning "and other things" or "and so on" may have been used herein to indicate that further features, similar to the ones that have just been enumerated, exist.

As used herein, the singular forms "a", "an" and "the" are intended to comprise also the plural forms as well, unless expressly stated otherwise. It will be further understood that the terms "includes," "comprises," "including" and/or "comprising," when used in this specification, specify the presence of stated features, actions, integers, steps, operations, elements, and/or components, but do not preclude the presence or addition of one or more other features, actions, integers, steps, operations, elements, components, and/or groups thereof.

Unless otherwise defined, all terms comprising technical and scientific terms used herein have the same meaning as commonly understood by one of ordinary skill in the art to which the described embodiments belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The invention claimed is:

1. A method, performed by a receiving node, for generating composite acknowledgement information for a Hybrid Automatic Repeat Request (HARQ) process, wherein said composite acknowledgement information is generated in response to transport blocks received from a transmitting node, wherein said method comprises:

providing, for each transport block, a positive acknowledgement/negative acknowledgement (ACK/NAK) indication for each of a plurality of transmissions of the transport block, to define a respective set of ACK/NAK indications; and generating said composite acknowledgement information based on the respective sets of ACK/NAK indications for said transport blocks over said plurality of transmissions, wherein A_i is the ACK/NAK indication for transmission number i, for a first transport block, and B_i is the ACK/NAK indication for transmission number i for a second transport block, and sets A and B, respectively are defined as:

$$A=\{A1,\ldots,Aj\}, B=\{B1,\ldots,Bj\},$$

for transmission number i between 1 and j, and
wherein said composite acknowledgement information is generated based on the sets A and B,
wherein an individual ACK is denoted by 1 and an individual NAK by 0, and wherein said composite acknowledgement information is defined as a composite acknowledgement:

$$C\_ACK\_NAK=\max(A)*\max(B),$$

where max is defined as a maximum function operating on the respective set A, B of ACK/NAK indications.

2. The method of claim 1, wherein said composite acknowledgement information is generated as a positive acknowledgment, ACK, if two transport blocks have been successfully received even though said two transport blocks do not belong to the same transmission.

3. The method of claim 1, wherein said method is performed for a HARQ process in a four-branch Multiple Input Multiple Output (MIMO) system.

4. The method of claim 1, wherein said method is performed for a HARQ process in a Long Term Evolution (LTE) Time-Division Duplex (TDD) system.

5. A method, performed by a receiving node, for providing composite acknowledgement information for a Hybrid Automatic Repeat Request (HARQ) process to a transmitting node, wherein said method comprises:

receiving data from said transmitting node, wherein said data is received from a number of repeated transmissions of a number of transport blocks from said transmitting node;

decoding the received data;

checking whether the data has been correctly received;

generating said composite acknowledgement information based on the correctness check, wherein said composite acknowledgement information is generated by the method of claim 1; and transmitting the composite acknowledgement information to the transmitting node.

6. An arrangement configured to generate, in response to transport blocks received from a transmitting node, composite acknowledgement information for a Hybrid Automatic Repeat Request (HARQ) process, wherein said arrangement comprises a processing circuit configured to provide, for each transport block, a positive acknowledgement/negative acknowledgement (ACK/NAK) indication for each of a plurality of transmissions of the transport block to define a respective set of ACK/NAK indications, wherein said processing circuit is further configured to generate said composite acknowledgement information based on the respective sets of ACK/NAK indications for said transport blocks over said plurality of transmissions, wherein said processing circuit is configured to generate said composite acknowledgement information based on sets A and B, wherein A_i is the ACK/NAK indication for transmission number i, for a first transport block, and B_i is the ACK/NAK indication for transmission number i for a second transport block, and the sets A and B, respectively are defined as:

$A=\{A1, \ldots, Aj\}, B=\{B1, \ldots, Bj\}$, for transmission number i between 1 and j, wherein said processing circuit is configured to operate based on an individual ACK being denoted by 1 and an individual NAK by 0, and to generate said composite acknowledgement information as a composite acknowledgement:

$C\_ACK\_NAK=\max(A)*\max(B)$, where max is defined as a maximum function operating on the respective set A, B of ACK/NAK indications.

7. The arrangement of claim 6, wherein said processing circuit is configured to generate said composite acknowledgement information as a positive acknowledgment, ACK, if two transport blocks have been successfully received even though said two transport blocks do not belong to the same transmission.

8. The arrangement of claim 6, wherein said arrangement is configured to generate composite acknowledgement information for a HARQ process in a four-branch Multiple Input Multiple Output (MIMO) system.

9. The arrangement of claim 6, wherein said arrangement is configured to generate composite acknowledgement information for a HARQ process in a Long Term Evolution (LTE) Time Division Duplex (TDD) system.

10. The arrangement of claim 6, wherein said arrangement is implemented in a node in a wireless communication system.

11. A node in a wireless communication system, wherein said node is configured to provide composite acknowledgement information for a Hybrid Automatic Repeat Request (HARQ) process to a transmitting node, wherein said node comprises:

a receiver configured to receive data from said transmitting node, wherein said data is received from a number of repeated transmissions of a number of transport blocks from said transmitting node;

an arrangement configured to generate, in response to the transport blocks received from said transmitting node, said composite acknowledgement information according to claim 6; and a transmitter configured to transmit said composite acknowledgement information to the transmitting node.

12. The node of claim 11, wherein said node is operating as a receiving node.

13. The node of claim 11, wherein said node is a User Equipment.

14. The node of claim 11, wherein said node is a base station.

15. A non-transitory computer-readable medium comprising, stored thereupon, a computer program configured to generate, when executed by a processing circuit, composite acknowledgement information, wherein said computer program comprises:

computer program code configured to provide, for each of a number of transport blocks, a positive acknowledgement/negative acknowledgement (ACK/NAK) indication for each of a plurality of transmissions of the transport block to define a respective set of ACK/NAK indications, wherein A_i is the ACK/NAK indication for transmission number i, for a first transport block, and B_i is the ACK/NAK indication for transmission number i for a second transport block, and sets A and B, respectively are defined as:

$A=\{A1, \ldots, Aj\}, B=\{B1, \ldots, Bj\}$, for transmission number i between 1 and j; and computer program code configured to generate said composite acknowledgement information based on the respective sets of ACK/NAK indications for said transport blocks over said plurality of transmissions in the following way:

$C\_ACK\_NAK=\max(A)*\max(B)$, wherein an individual ACK is denoted by 1 and an individual NAK by 0, and max is defined as a maximum function operating on the respective set of ACK/NAK indications.

* * * * *